US010630735B2

(12) United States Patent
Kato

(10) Patent No.: US 10,630,735 B2
(45) Date of Patent: *Apr. 21, 2020

(54) COMMUNICATION TERMINAL, COMMUNICATION SYSTEM, COMMUNICATION METHOD, AND RECORDING MEDIUM

(71) Applicant: Ricoh Company, Ltd., Tokyo (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,458

(22) Filed: Oct. 12, 2018

(65) Prior Publication Data

US 2019/0044983 A1 Feb. 7, 2019

Related U.S. Application Data

(63) Continuation of application No. 15/151,991, filed on May 11, 2016, now Pat. No. 10,122,770.

(30) Foreign Application Priority Data

May 29, 2015 (JP) .................................. 2015-109992

(51) Int. Cl.
*H04L 29/06* (2006.01)
*H04W 4/80* (2018.01)
*H04L 29/12* (2006.01)

(52) U.S. Cl.
CPC ........ *H04L 65/1083* (2013.01); *H04L 63/083* (2013.01); *H04L 63/0876* (2013.01);
(Continued)

(58) Field of Classification Search
CPC ............... H04L 65/1083; H04L 63/083; H04L 63/0876; H04L 63/102; H04L 63/123;
(Continued)

(56) References Cited

U.S. PATENT DOCUMENTS 5,826,051 A * 10/1998 Porter ................... G06F 3/0481
715/810
7,818,020 B1 * 10/2010 Manroa ............... H04L 29/1216
455/3.01
(Continued)

FOREIGN PATENT DOCUMENTS

JP 2002-218556 A 8/2002
JP 2009-290500 A 12/2009
(Continued)

OTHER PUBLICATIONS

Office Action dated Jan. 22, 2019 in the corresponding Japanese Patent Application No. 2015-109992.

*Primary Examiner* — Ghodrat Jamshidi
(74) *Attorney, Agent, or Firm* — Oblon, McClelland, Maier & Neustadt, L.L.P.

(57) ABSTRACT

A communication terminal receives, from a mobile terminal, counterpart terminal identification information for identifying a counterpart communication terminal that the communication terminal is to start communication, and determines a communication application to be used by the counterpart communication terminal based on the received counterpart terminal identification information. When the determined communication application is a first communication application, the communication terminal identifies, as the counterpart communication terminal, a first counterpart communication terminal that uses the first communication application. When the determined communication application is a second communication application, the communication terminal identifies, as the counterpart communication terminal, a second counterpart communication terminal that uses the second communication application. The communication terminal further transmits a communication start request to the identified counterpart communication terminal that uses the determined communication application, to start (Continued)

communication with the identified counterpart communication terminal through the determined communication application.

16 Claims, 22 Drawing Sheets

(52) U.S. Cl.
CPC .......... *H04L 63/102* (2013.01); *H04L 63/123* (2013.01); *H04L 65/605* (2013.01); *H04W 4/80* (2018.02); *H04L 61/307* (2013.01); *H04L 61/3065* (2013.01); *H04L 65/403* (2013.01)

(58) Field of Classification Search
CPC . H04L 61/3065; H04L 61/307; H04L 65/403; H04L 65/605
See application file for complete search history.

(56) References Cited

U.S. PATENT DOCUMENTS

| | | | | |
|---|---|---|---|---|
| 8,294,747 | B1* | 10/2012 | Weinberg | H04N 7/148 348/14.01 |
| 9,544,197 | B2* | 1/2017 | Kanda | H04L 41/22 |
| 9,961,080 | B2 | 5/2018 | Vishwanath | |
| 10,069,830 | B2* | 9/2018 | Okuyama | H04L 65/1093 |
| 2004/0119814 | A1* | 6/2004 | Clisham | H04N 7/141 348/14.08 |
| 2006/0058012 | A1 | 3/2006 | Caspi | |
| 2008/0136897 | A1* | 6/2008 | Morishima | H04L 12/1822 348/14.08 |
| 2010/0250252 | A1 | 9/2010 | Yasoshima | |
| 2010/0281268 | A1 | 11/2010 | Barreto | |
| 2011/0249073 | A1* | 10/2011 | Cranfill | H04N 7/147 348/14.02 |
| 2012/0317261 | A1 | 12/2012 | Ahmavaara | |
| 2013/0041973 | A1* | 2/2013 | Zhou | H04N 21/632 709/213 |
| 2013/0151623 | A1* | 6/2013 | Weiser | H04N 7/147 709/205 |
| 2014/0073244 | A1* | 3/2014 | Ko | H04W 4/80 455/41.1 |
| 2014/0077937 | A1 | 3/2014 | Kato et al. | |
| 2014/0324975 | A1* | 10/2014 | Tamura | H04L 12/1813 709/204 |
| 2014/0375757 | A1 | 12/2014 | Asai | |
| 2015/0056975 | A1* | 2/2015 | Park | H04B 5/02 455/418 |
| 2015/0074765 | A1 | 3/2015 | Haight | |
| 2015/0230087 | A1* | 8/2015 | Barkan | H04L 63/0876 455/411 |
| 2015/0295777 | A1* | 10/2015 | Cholkar | G06F 3/04842 715/753 |
| 2015/0365526 | A1 | 12/2015 | Mihara et al. | |
| 2016/0173450 | A1* | 6/2016 | Mircescu | H04L 67/12 726/14 |
| 2018/0115897 | A1* | 4/2018 | Einberg | H04B 1/385 |

FOREIGN PATENT DOCUMENTS

| | | |
|---|---|---|
| JP | 2012-178135 | 9/2012 |
| JP | 2013-085208 | 5/2013 |
| JP | 2014-060552 | 4/2014 |
| JP | 2014-146281 | 8/2014 |
| JP | 2015-080112 A | 4/2015 |

* cited by examiner

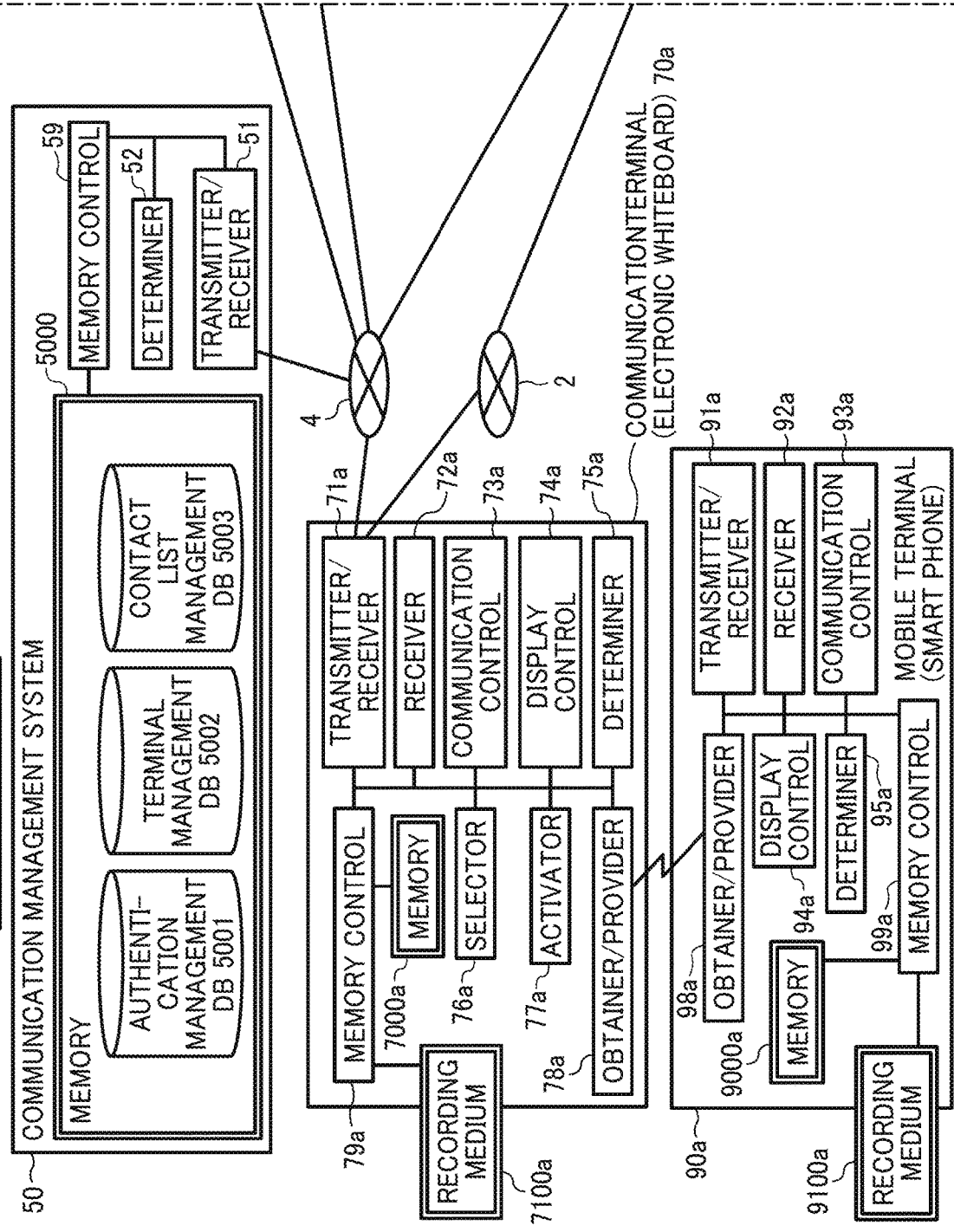

FIG. 9

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL MANAGEMENT TABLE

| TERMINAL ID | COUNTERPART TERMINAL NAME | OPERATING STATE | DATE/TIME RECEIVED | IP ADDRESS OF TERMINAL |
|---|---|---|---|---|
| 01aa | AA TERMINAL, TOKYO OFFICE, JAPAN | ONLINE (COMMUNICATION OK) | 2014.4.10.13:40 | 1.2.1.3 |
| 01ab | AB TERMINAL, OSAKA OFFICE, JAPAN | ONLINE (COMMUNICATION OK) | 2014.4.09.12:00 | 1.2.1.4 |
| ... | ... | ... | ... | ... |
| 01ba | BA TERMINAL, BEIJINIG OFFICE, CHINA | OFFLINE | 2014.4.10.13:45 | 1.2.2.3 |
| 07bb | BB TERMINAL, SHANGHAI OFFICE, CHINA | ONLINE (INTERRUPTED) | 2014.4.10.13:50 | 1.2.2.4 |
| ... | ... | ... | ... | ... |
| 01ca | CA TERMINAL, WASHINGTON D.C. OFFICE, U.S. | OFFLINE | 2014.4.10.12:45 | 1.3.1.3 |
| 01cb | CB TERMINAL, NEW YORK OFFICE, U.S. | ONLINE (COMMUNICATING) | 2014.4.10.13:55 | 1.3.1.4 |
| ... | ... | ... | ... | ... |
| 01da | DA TERMINAL, BERLIN OFFICE, EUROPE | ONLINE (COMMUNICATING) | 2014.4.08.12:45 | 1.3.2.3 |
| 07db | DB TERMINAL, LONDON OFFICE, EUROPE | ONLINE (COMMUNICATION OK) | 2014.4.10.12:45 | 1.3.2.4 |
| ... | ... | ... | ... | ... |

FIG. 11

CONTACT LIST MANAGEMENT TABLE

| STARTING TERMINAL ID | COUNTERPART TERMINAL ID |
|---|---|
| 01aa | 01ab, ···, 01ba, 07bb, ···, 01ca, 01cb, 01da, 07db, ··· |
| 01ab | 01aa, 01ca, 01cb |
| 01ba | 01aa, 01ab, 01ca, 01cb, 01da, 07db |
| ··· | ··· |
| 07db | 01aa, 01ab, 01ba, ···, 01da, 01ca, 01cb, ···, 01da |
| ··· | ··· |

FIG. 12

| BLOCK NO. | | DATA |
|---|---|---|
| 1 | [UNIQUE NUMBER] | 1234567 |
| 2 | [USER NAME] | James |
| 3 | [(OBTAIN) TERMINAL ID(1)] | 1.3.2.4 |
| 4 | [(OBTAIN) TERMINAL ID(2)] | |
| 5 | [(OBTAIN) TERMINAL ID(3)] | |
| 6 | [(RECEIVE) TERMINAL ID(1)] | |
| 7 | [(RECEIVE) TERMINAL ID(2)] | |
| 8 | [(RECEIVE) TERMINAL ID(3)] | |

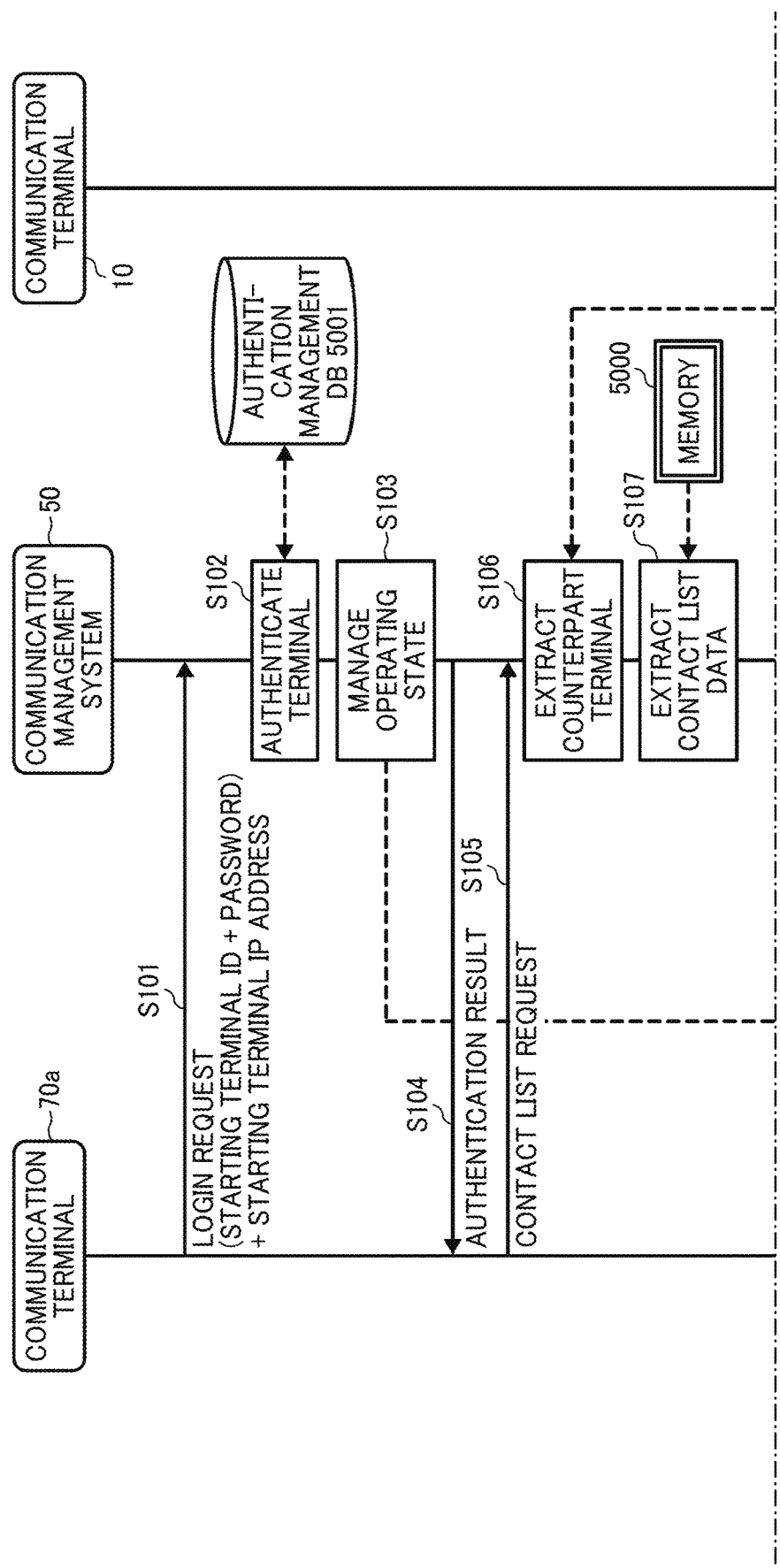

COMMUNICATION TERMINAL, COMMUNICATION SYSTEM, COMMUNICATION METHOD, AND RECORDING MEDIUM

CROSS-REFERENCE TO RELATED APPLICATIONS

This application is a continuation of and claims the benefit of priority under 35 U.S.C. § 120 from U.S. application Ser. No. 15/151,991 filed May 11, 2016, and claims the benefit of priority under 35 U.S.C. § 119 from Japanese Patent Application No. 2015-109992 filed May 29, 2015, the entire contents of each of which are incorporated herein by reference.

BACKGROUND

Technical Field

The present invention generally relates to a communication terminal, a communication system, a communication method, and a non-transitory recording medium storing a communication control program.

Description of the Related Art

With the increased need for reducing business trip costs and time in recent years, videoconference systems are now widely used. The videoconference systems transmit or receive image data and audio data among a plurality of communication terminals such as videoconference terminals.

SUMMARY

Example embodiments include a communication terminal to communicate with a counterpart communication terminal. The communication terminal receives, from a mobile terminal, counterpart terminal identification information for identifying a counterpart communication terminal that the communication terminal is to start communication. The mobile terminal is a mobile terminal that has obtained the counterpart terminal identification information from the counterpart communication terminal. The communication terminal further determines a communication application to be used by the counterpart communication terminal in communication with the communication terminal, based on the received counterpart terminal identification information. When the determined communication application is a first communication application, the communication terminal identifies, as the counterpart communication terminal, a first counterpart communication terminal that uses the first communication application. When the determined communication application is a second communication application, the communication terminal identifies, as the counterpart communication terminal, a second counterpart communication terminal that uses the second communication application. The communication terminal further transmits a communication start request to the identified counterpart communication terminal that uses the determined communication application, to start communication with the identified counterpart communication terminal through the determined communication application.

Example embodiments include a method performed by the communication terminal as described above, and a control program for causing the communication terminal to perform the method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 8A and 8B (FIG. 8) are a schematic block diagram illustrating a functional configuration of the communication system of FIG. 1 according to the embodiment of the present invention;

FIG. 9 is an illustration of an example data structure of an authentication management table;

FIG. 10 is an illustration of an example data structure of a terminal management table;

FIG. 11 is an illustration of an example data structure of a contact list management table;

FIG. 12 is an illustration of an example data structure of a near-distance communication circuit;

FIGS. 19A and 19B (FIG. 19) are a data sequence diagram illustrating operation of preparing for communication between the communication terminals of the communication system of FIG. 1;

Figure 1:
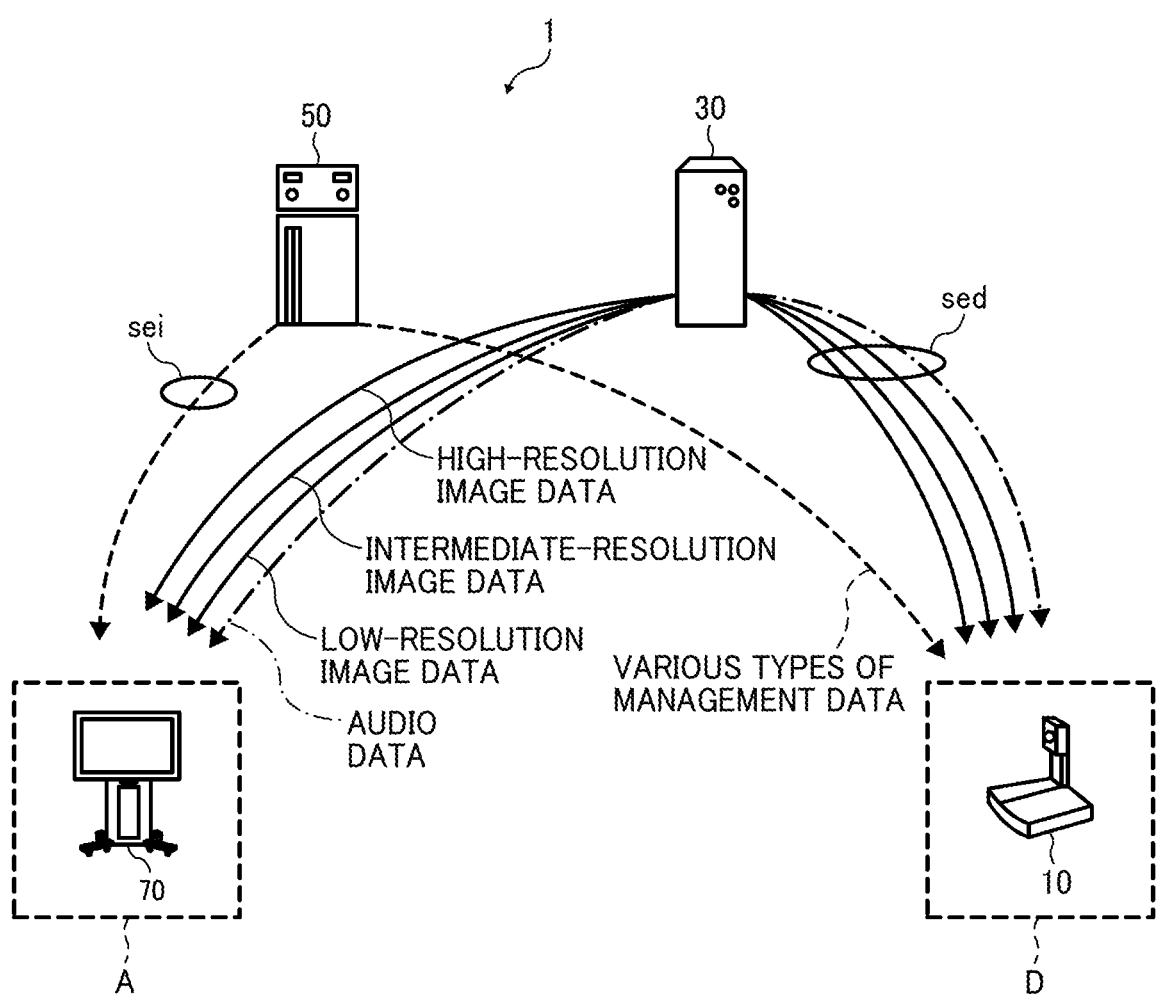
FIG. 1 is a schematic diagram illustrating a part of a communication system relating to videoconference communication, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to the drawings, some embodiments of the present invention are described.

<Configuration of Communication System>

Referring to FIG. 1, a communication system 1 for carrying out videoconference among a plurality of communication terminals (10, 70) is described according to the embodiment. FIG. 1 is a schematic diagram illustrating a portion of the communication system 1, which relates to videoconference being carried out between the communication terminals 10 and 70.

In the following, it is assumed that the communication system 1 manages transmission of content data to carry out videoconference among the terminals. Alternatively, the communication system 1 may manage transmission of content data to carry out casual conversation among the users at different sites.

The communication system 1 includes the plurality of communication terminals (10, 70), a relay device 30, and a communication management system 50. The communication terminal transmits or receives image data and audio data as an example of content data. In FIG. 1, the communication terminal may be implemented by a videoconference terminal 10 in one example, or by en electronic whiteboard 70 in another example. The electronic whiteboard 70 is provided with a function of carrying out videoconference. The image data may be a video image or a still image, or both of the video image and the still image.

In this disclosure, the communication terminal that sends a request for starting videoconference is referred to as the "starting terminal", and the communication terminal serving as a request destination (relay destination) of videoconference is referred to as the "counterpart terminal". In FIG. 1, the communication terminal 70 operates as the starting terminal, and the communication terminal 10 operates as the counterpart terminal. Alternatively, when the communication terminal 10 requests to start videoconference with the communication terminal 70, the communication terminal 10 operates as the starting terminal, and the communication terminal 70 operates as the counterpart terminal. Note that the communication terminal may be used not only for communication between different offices or for communication between different rooms in the same office, but also for communication within the same room or for outdoor-indoor communication or outdoor-outdoor communication.

The relay device 30 relays content data among the plurality of communication terminals 10 and 70. The communication management system 50 centrally controls login authentication of the communication terminal, management of the communication state of the communication terminal, management of a contact list, and management of the communication state or the like of the relay device 30. The relay devices 30 and the management system 50 in the above-described embodiment may be configured by a single computer or a plurality of computers to which divided portions (functions) are arbitrarily allocated.

In the communication system 1, a management data session "sei" is established between the starting terminal 70 and the counterpart terminal 10 via the communication management system 50 to transmit or receive various management data. Between the starting terminal 70 and the counterpart terminal 10, four sessions are established via the relay device 30 to transmit or receive four items of data including high-resolution image data, intermediate-resolution image data, low-resolution image data, and audio data. In FIG. 1, these four sessions are collectively referred to as image and audio data session "sed". The image and audio data session "sed" may not always include four sessions, but any number of sessions greater than or less than four.

Now, resolution of image data to be processed in this embodiment is described. The low-resolution image data serves as a base image and has horizontal 160 pixels by vertical 120 pixels. The intermediate-resolution image data has horizontal 320 pixels by vertical 240 pixels. The high-resolution image data has horizontal 640 pixels by vertical 480 pixels. In the case of a narrow band path, low-quality image data that only includes low-resolution image data serving as a base image is relayed. In the case of a relatively wide band path, intermediate-quality image data including low-resolution image data serving as a base image and intermediate-resolution image data is relayed. In the case of a very wide band path, high-quality image data including low-resolution image data serving as a base image, intermediate-resolution image data, and high-resolution image data is relayed. Since audio data is relatively small in data size, the audio data is relayed even in the case of a narrow band path.

<Hardware Configuration of Communication System>

Now, a hardware configuration of the communication system 1 is described.

<Hardware Configuration of Communication Terminal>

Figure 2:
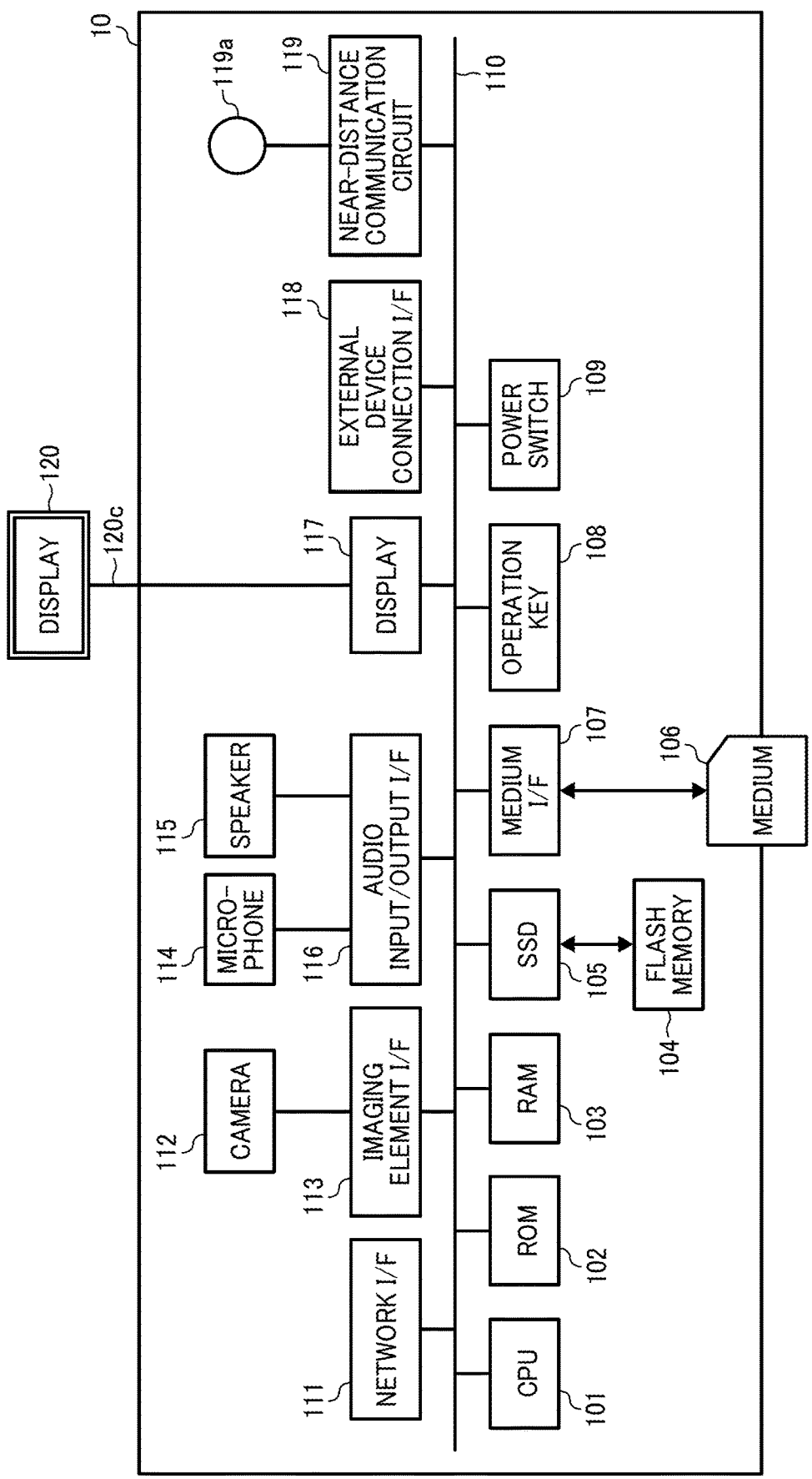
FIG. 2 is a schematic block diagram illustrating a hardware configuration of the communication terminal of FIG. 2.

FIG. 2 is a schematic block diagram illustrating a hardware configuration of the communication terminal 10. As illustrated in FIG. 2, the videoconference terminal as an example of the communication terminal includes a central processing unit (CPU) 101, a read only memory (ROM) 102, a random access memory (RAM) 103, a flash memory 104, a solid state drive (SSD) 105, a medium interface (I/F) 107, an operation key 108, a power switch 109, a bus line 110, a network I/F 111, a camera 112, an imaging device I/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls entire operation of the communication terminal 10. The ROM 102 stores a control program for operating the CPU 101 such as an Initial Program Loader (IPL). The RAM 103 is used as a work area for the CPU 101. The flash memory 104 stores various data such as a communication control program, image data, and audio data. The SSD 105 controls reading or writing of various data to or from the flash memory 105 under control of the CPU 101. In alternative to the SSD, a hard disk drive (HDD) may be used. The medium I/F 107 controls reading or writing of data with respect to a recording medium 106 such as a flash memory. The operation key 108 is operated by a user to input a user instruction such as a user selection of a destination of the communication terminal 10. The power switch 109 turns on or off the power of the communication terminal 10.

The network I/F 111 allows communication of data with an external device through a communication network 4 such as the Internet. The camera 112 is an example of imaging device capable of capturing a subject under control of the CPU 101, and may be incorporated in the communication terminal. The imaging element device I/F 113 is a circuit that controls driving of the camera 112. The microphone 114 is an example of audio collecting device capable of inputting audio under control of the CPU 101, and may be incorporated in the communication terminal. The audio I/O I/F 116 is a circuit for inputting or outputting an audio signal between the microphone 114 and the speaker 115 under control of the CPU 101. The display I/F 117 is a circuit for transmitting image data to the external display 120 under control of the CPU 101. The external device connection I/F 118 is an interface circuit that connects the terminal 10 to various external devices. The near-distance communication circuit 119 is a communication circuit in compliance with a near-field communication (NFC; Registered Trademark) or Bluetooth (Registered Trademark).

The bus line 110 may be an address bus or a data bus, which electrically connects various elements such as the CPU 101 of FIG. 2.

The display 120 may be a liquid crystal or organic electroluminescence (EL) display that displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. In addition, a non-volatile memory that reads or writes data under control of the CPU 101 is not limited to the flash memory 104, and an electrically erasable and programmable read-only memory (EEPROM) may be used instead.

<Hardware Configuration of Communication Management System and Relay Device>

Figure 3:
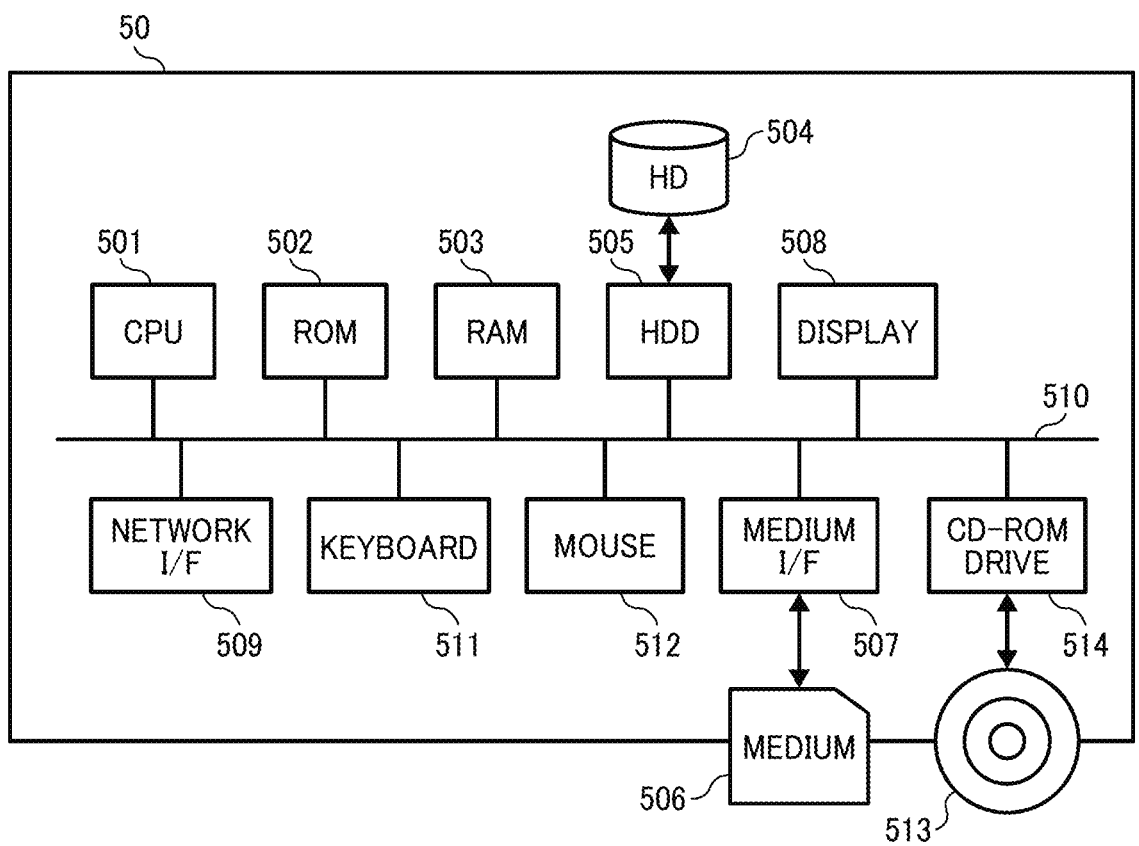
FIG. 3 is a schematic block diagram illustrating a hardware configuration of a communication management system and a relay device of the communication system of FIG. 1.

Referring to FIG. 3, a hardware configuration of the communication management system 50 and the relay device 30 is described according to an embodiment of the present invention. The communication management system 50, which may be implemented by a server computer, includes a central processing unit (CPU) 501, a read only memory (ROM) 502, a random access memory (RAM) 503, a hard disk (HD) 504, a hard disk drive (HDD) 505, a recording medium 506, a medium I/F 507, a display 508, a network I/F 509, a keyboard 511, a mouse 512, a CD-ROM drive 514, and a bus line 510.

The CPU 510 controls entire operation of the communication management system 50. The ROM 502 stores a control program for controlling the CPU 501 such as an IPL. The RAM 503 is used as a work area for the CPU 501. The HD 504 stores various data such as the communication management program. The HDD 505 controls reading or writing of various data to or from the HDD 504 under control of the CPU 501. The medium I/F 507 controls reading or writing of data with respect to a recording medium 506 such as a flash memory. The display 508 displays various information such as a cursor, menu, window, characters, or image. The network I/F 509 allows communication of data with an external device through the second communication network 4 such as the Internet. The keyboard 511 is one example of input device provided with a plurality of keys for allowing a user to input characters, numerals, or various instructions. The mouse 512 is one example of input device for allowing the user to select a specific instruction or execution, select a target for processing, or move a curser being displayed. The CD-ROM drive 514 reads or writes various data with respect to a CD-ROM 513, which is one example of removable recording medium.

The bus line 510 may be an address bus or a data bus, which electrically connects various elements such as the CPU 501 of FIG. 3.

Since the relay device 30 in FIG. 1 is substantially similar in hardware configuration to the communication management system 50, the description thereof is omitted. The relay device 30, however, stores a relay control program in the HD 504 in alternative to the management program.

<Hardware Configuration of Electronic Whiteboard>

Figure 4:
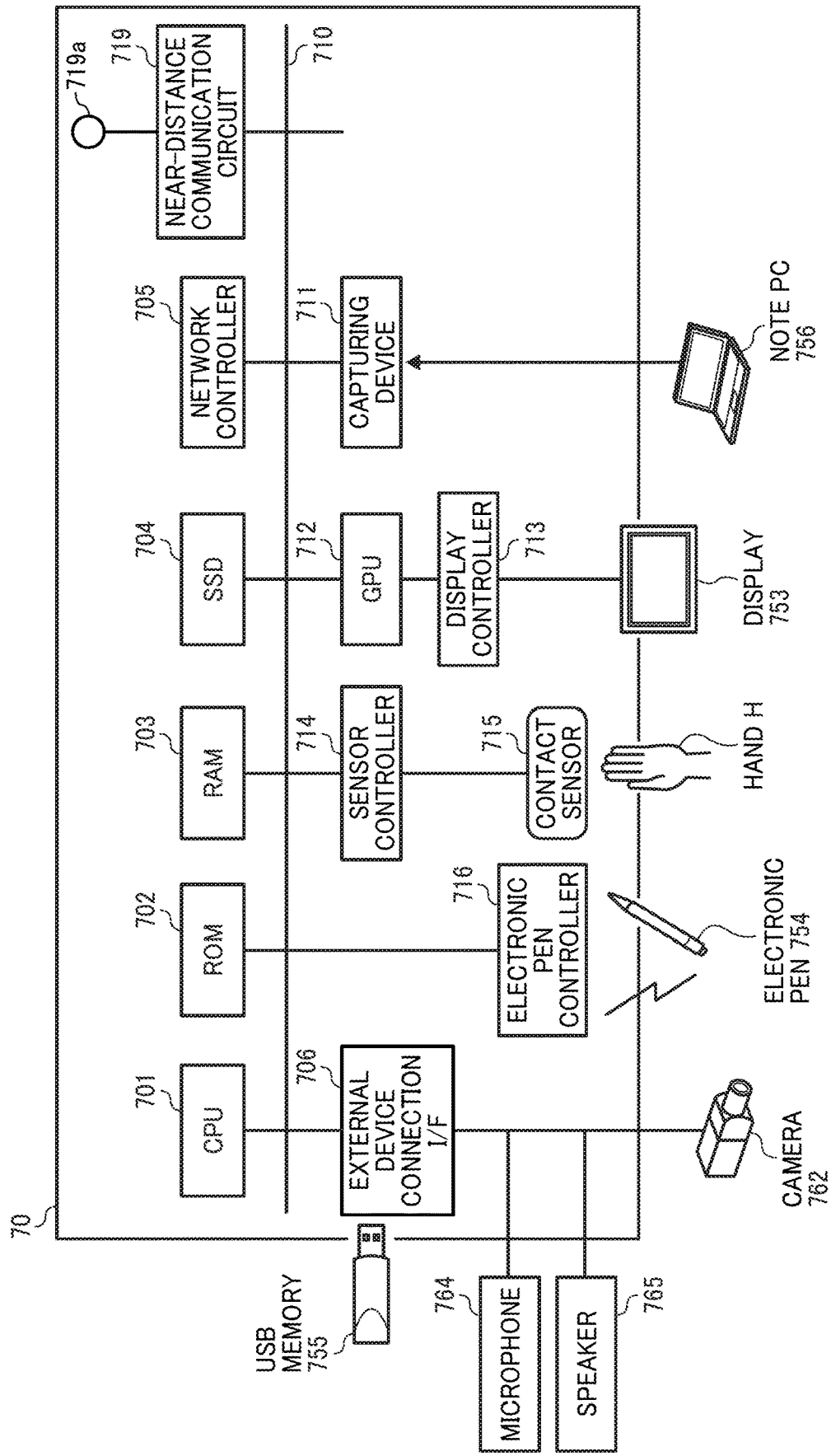
FIG. 4 is a schematic block diagram illustrating a hardware configuration of an electronic whiteboard of the communication system of FIG. 1.

FIG. 4 illustrates a hardware configuration of the communication terminal 70, when implemented by the electronic whiteboard, according to the embodiment. As illustrated in FIG. 4, the electronic whiteboard 70, as an example of communication terminal 70, includes a CPU 701, a ROM 702, a RAM 703, a SSD 704, a network controller 705, and an external device connection I/F 706, which are connected through the bus line 710.

The CPU 701 controls entire operation of the electronic whiteboard 70. The ROM 702 stores a control program for controlling the CPU 701 such as an IPL. The RAM 503 is used as a work area for the CPU 701. The SSD 704 stores various data such as the control program for the electronic whiteboard 70. The network controller 705 controls communication with an external device through the communication network 2 or 4. The external device controller 706 controls communication with an external device such as a USB memory 755, and external devices such as a camera 762, a speaker 765, a microphone 764, etc.

The electronic whiteboard 70 further includes a capturing device 711, a graphics processing unit (GPU) 71, a display controller 713, a sensor controller 714, a contact sensor 715, an electronic pen controller 716, a near-distance communication circuit 719, and an antenna 719*a* for the near-distance communication circuit 719.

The capturing device 711 causes a display of a notebook PC 756 to display a video image or a still image based on image data that is captured by the capturing device 711. In this way, the image being displayed on the display 753 of the electronic whiteboard 70 can be shared with the external display. The GPU 712 is a semiconductor chip dedicated to processing a graphical image. The display controller 713 controls display of an image processed at the GPU 712 for output through a display 753 provided with the electronic whiteboard 70. The contact sensor 715 detects a touch onto the display 753 with an electronic pen 754 or a user's hand H. The sensor controller 714 controls operation of the contact sensor 715. The contact sensor 715 senses a touch input to a specific coordinate on the display 735 using the infrared blocking system. More specifically, the display 753 is provided with two light receiving elements disposed on both upper side ends of the display 753, and a reflector frame. The light receiving elements emit a plurality of infrared rays in parallel to a touch panel of the display 753. The light receiving elements receive lights passing in the direction that is the same as an optical path of the emitted infrared rays, which are reflected by the reflector frame. The contact sensor 715 outputs an identifier (ID) of the infrared ray that is blocked by an object (such as the user's hand) after being emitted from the light receiving elements, to the sensor controller 714. Based on the ID of the infrared ray, the sensor controller 715 detects a specific coordinate that is touched. The electronic pen controller 716 communicates with the electronic pen 754 to detect a touch by the tip or bottom of the pen 754 to the display 753. The near-distance communication circuit 719 is a communication circuit that communicates in compliance with the NFC (Registered Trademark), the Bluetooth (Registered Trademark), and the like.

The bus line 710 is an address bus or a data bus, which electrically connects the elements in FIG. 4 such as the CPU 701.

The contact sensor 715 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the pen 754, the electronic pen controller 716 may also detect a touch by another part of the electronic pen 754, such as a part held by a hand.

<Hardware Configuration of Smart Phone>

Figure 5:
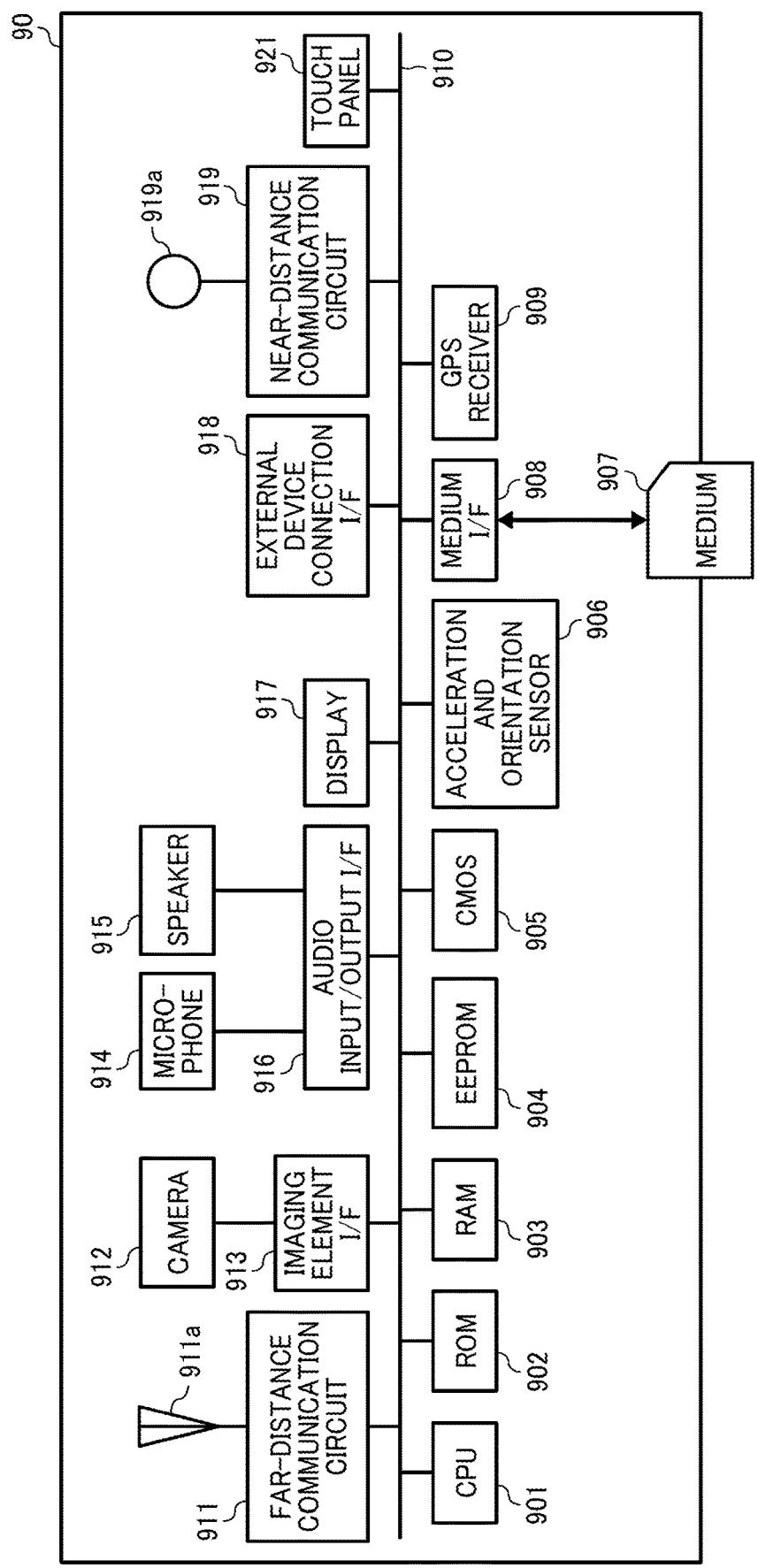
FIG. 5 is a schematic block diagram illustrating a hardware configuration of a smart phone or a tablet of the communication system of FIG. 1.

FIG. 5 illustrates a hardware configuration of a smart phone, according to the embodiment of the present invention. As illustrated in FIG. 5, the communication terminal 90, which may be implemented by a smart phone, includes a CPU 901, a ROM 902, a RAM 903, an Electrically Erasable and Programmable ROM (EEPROM) 904, a Complementary Metal Oxide Semiconductor (CMOS) sensor 905, an acceleration and orientation sensor 906, a medium I/F 908, and a GPS receiver 909, which are connected through a bus line 910.

The CPU 901 controls entire operation of the smart phone 90. The ROM 902 stores a control program for controlling the CPU 901 such as an IPL. The RAM 903 is used as a work area for the CPU 901. The EEPROM 904 reads or writes various data such as a communication terminal control program under control of the CPU 901. The CMOS sensor 905 captures an object under control of the CPU 901 to obtain captured image data. The acceleration and orientation sensor 906 includes various sensors such as an electromagnetic compass or gyrocompass for detecting geomagnetism and an acceleration sensor. The medium I/F 908 controls reading or writing of data with respect to a recording medium 907 such as a flash memory. The GPS receiver 909 receives a GPS signal from a GPS satellite.

The communication terminal 90 further includes a far-distance communication circuit 911, a camera 912, an imaging element I/F 913, a microphone 914, a speaker 915, an audio input/output I/F 918, a display 917, an external device connection I/F 918, a near-distance communication circuit 919, an antenna 919*a* for the near-distance communication circuit 919, and a touch panel 921.

The far-distance communication circuit 911 is a circuit that communicates with the other device through a mobile communication network. The camera 912 is an example of imaging device capable of capturing a subject under control of the CPU 901, and is incorporated in the communication terminal 90, which is the smart phone. The imaging element device I/F 913 is a circuit that controls driving of the camera 912. The microphone 914 is an example of audio collecting device capable of inputting audio under control of the CPU 901, and is incorporated in the communication terminal 90. The audio I/O I/F 916 is a circuit for inputting or outputting an audio signal between the microphone 914 and the speaker 915 under control of the CPU 901. The display 915 may be a liquid crystal or organic electro luminescence (EL) display that displays an image of a subject, an operation icon, or the like. The external device connection I/F 918 is an interface circuit that connects the terminal 90 to various external devices. The near-distance communication circuit 919 is a communication circuit that communicates in compliance with the NFC (Registered Trademark), the Bluetooth (Registered Trademark), and the like. The touch panel 921 is an example of input device that enables the user to input a user instruction through touching a screen of the display 917.

The bus line 910 is an address bus or a data bus, which electrically connects the elements in FIG. 5 such as the CPU 901.

The communication terminal 90 may be implemented by a tablet, a smart watch, portable phone, or portable game machine.

Further, the control program may be recorded in a file in a format installable or executable on a computer-readable recording medium such as the recording medium 907 for distribution. Examples of the recording medium include, but not limited to, Compact Disc Recordable (CD-R), Digital Versatile Disc (DVD), blue-ray disc, and SD card.

<Software Configuration of Communication Terminal>

Figure 6A:
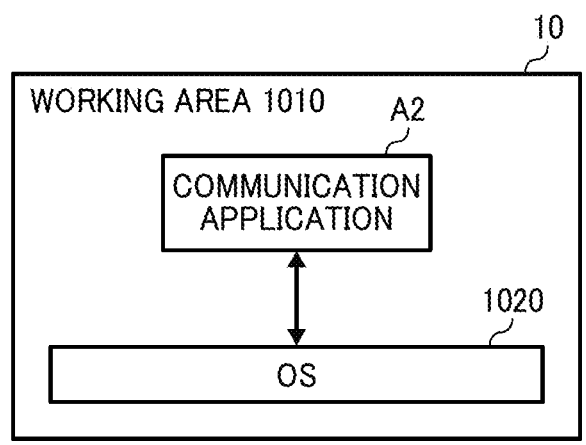
FIG. 6A is a schematic block diagram illustrating a software configuration of the communication terminal as the videoconference terminal according to the embodiment of the invention.

FIG. 6A illustrates a software configuration of the communication terminal 10 as the videoconference terminal according to the embodiment of the invention. As illustrated in FIG. 6A, the communication terminal 10 is installed with operating system (OS) 1020 and communication application A2, which may be deployed on a working area 1020 of the RAM 103. The OS 1020 is basic software that controls entire operation of the videoconference terminal 10 through providing basic functions.

The communication application A2 allows the communication terminal 10 to communicate with the other communication terminal. In this embodiment, the communication application A2 allows the communication terminal 10 to carry out video communication such as videoconference.

Figure 6B:
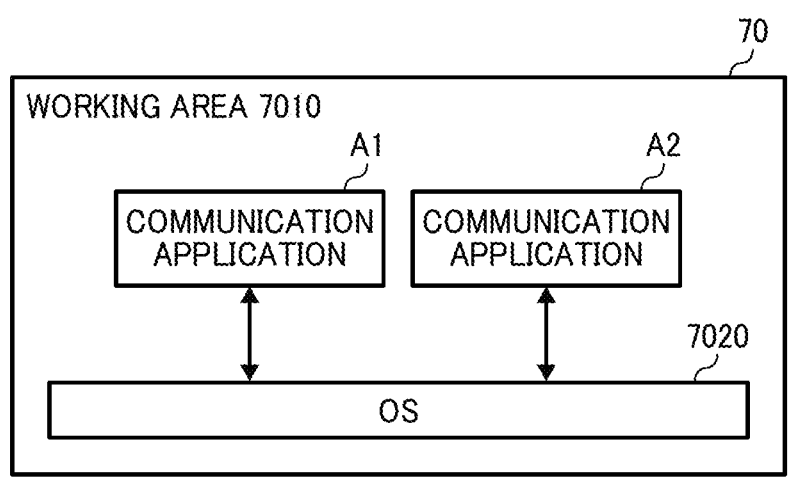
FIG. 6B is a schematic block diagram illustrating a software configuration of the communication terminal as the electronic whiteboard according to the embodiment of the present invention.

FIG. 6B illustrates a software configuration of the communication terminal 70 as the electronic whiteboard according to the embodiment of the invention. As illustrated in FIG. 6B, the communication terminal 70 is installed with communication application A1 and the communication application A2, which may be deployed on a working area 7010 of the RAM 703.

The OS 7020 is basic software that controls entire operation of the electronic whiteboard 70 through providing basic functions. The communication application A1 is communication application to be used by electronic whiteboards in communicating with the other communication terminal, such as communication application dedicated to the electronic whiteboards. The communication application A2 is communication application that enables video communication such as videoconferencing, as described above for the case of the communication application A2 installed onto the communication terminal 10. In this disclosure, only two types of communication applications A1 and A2 will be described for simplicity, however, more than two communication applications may be used to carry out videoconference among a plurality of communication terminals.

The OS 1020 and the communication application A2 are installed onto the videoconference terminal 10 before shipment. The OS 7020, the communication application A1, and the communication application A2 are installed onto the electronic whiteboard 70 before shipment.

Alternatively, any type of communication application may be added or deleted to or from the communication terminal (10, 70), for example, when software installed on the communication terminal is updated. More specifically, after being shipped to the user, the communication terminal (10, 70) may access the communication management system 50 or any other server to download the upgraded version of, or new, software. Further, the communication terminal (10, 70) may replace the existing software with the new version, or upgraded version, of software (control program) being downloaded. When updating software, the communication application installed onto the communication terminal (10, 70) may be upgraded, or replaced with a new version.

<Configuration of Communication System>

Figure 7:
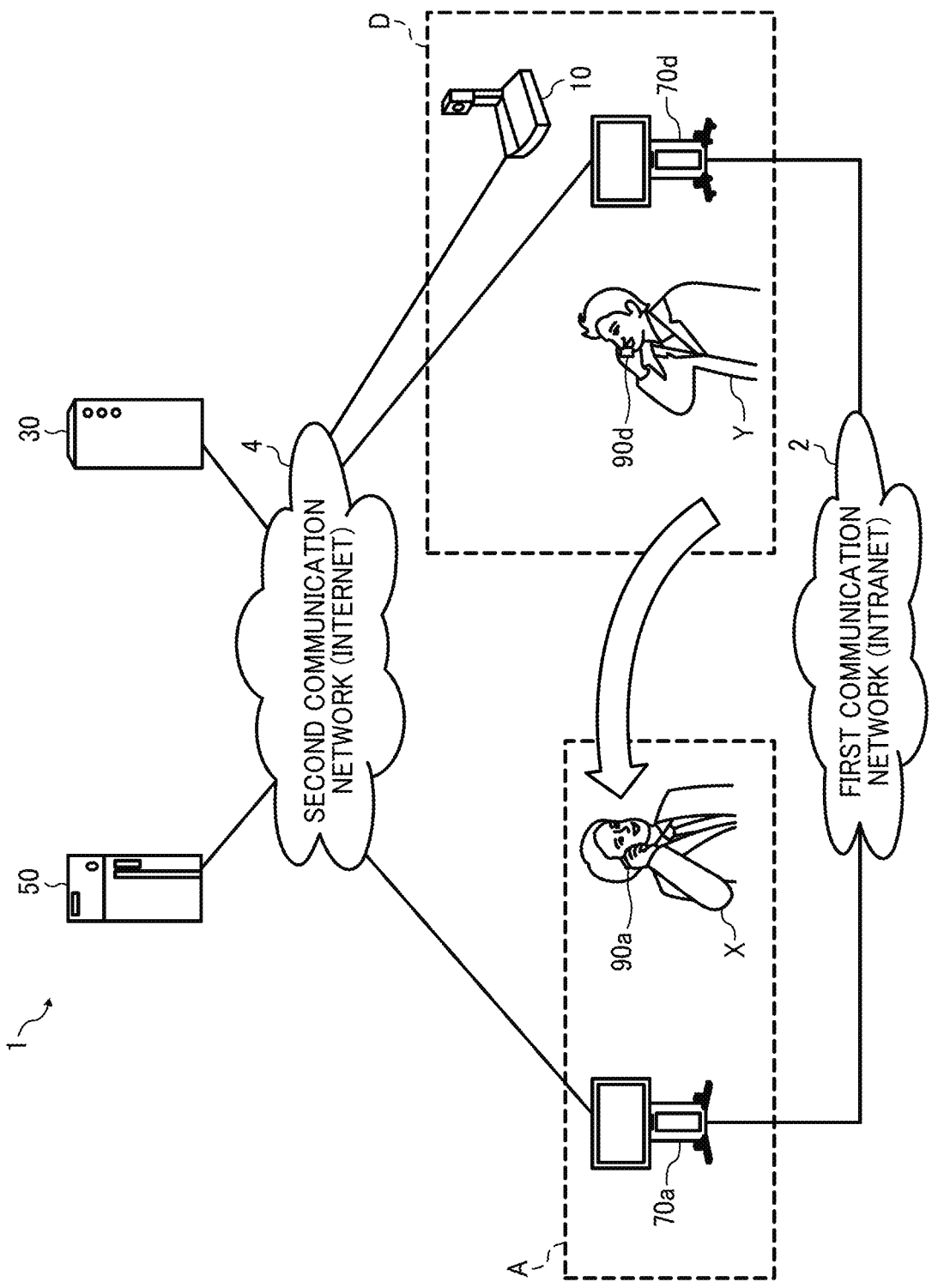
FIG. 7 is a schematic diagram illustrating a network configuration of the communication system of FIG. 1.

Referring now to FIG. 7, a configuration of the communication system 1 is described according to the embodiment. FIG. 7 is a schematic diagram illustrating a network configuration of the communication system 1 of FIG. 1.

In FIG. 7, the communication terminals 70a and 70d are examples of the electronic whiteboard 70 described above referring to FIG. 4. The mobile terminals 90a and 90b are examples of the mobile terminal 90 described above referring to FIG. 5.

The communication terminal (electronic whiteboard) 70a and the communication terminal (electronic whiteboard) 70d are connected to a closed communication network 2 such as the Intranet. Since this is closed, the communication network 2 is more secure. The communication terminal (videoconference terminal) 10 is connected to an open communication network 4 such as the Internet. The communication network 4 tends to be insecure, at least compared to the communication network 2. In order to improve security, in this embodiment, a firewall is provided on the communication network 4. In this disclosure, the communication network 2 may be referred to as a first communication network 2, and the communication network 4 may be referred to as a second communication network 4. The first and second communication networks 2 and 4 may each include a wireless network.

The communication terminal 70a is provided at site A. The communication terminals 10 and 70d are provided at site D. For example, the site A may be Japan, and the site B may be England. FIG. 7 illustrates a case in which a user X who usually works at site D and has the mobile terminal 90a, travels to site A. The user X at site A operates the communication terminal 70d to start communication with the communication terminal 10 or 70d, to start videoconference with a user Y at site D.

<Functional Configuration of Communication System>

Figure 8B:
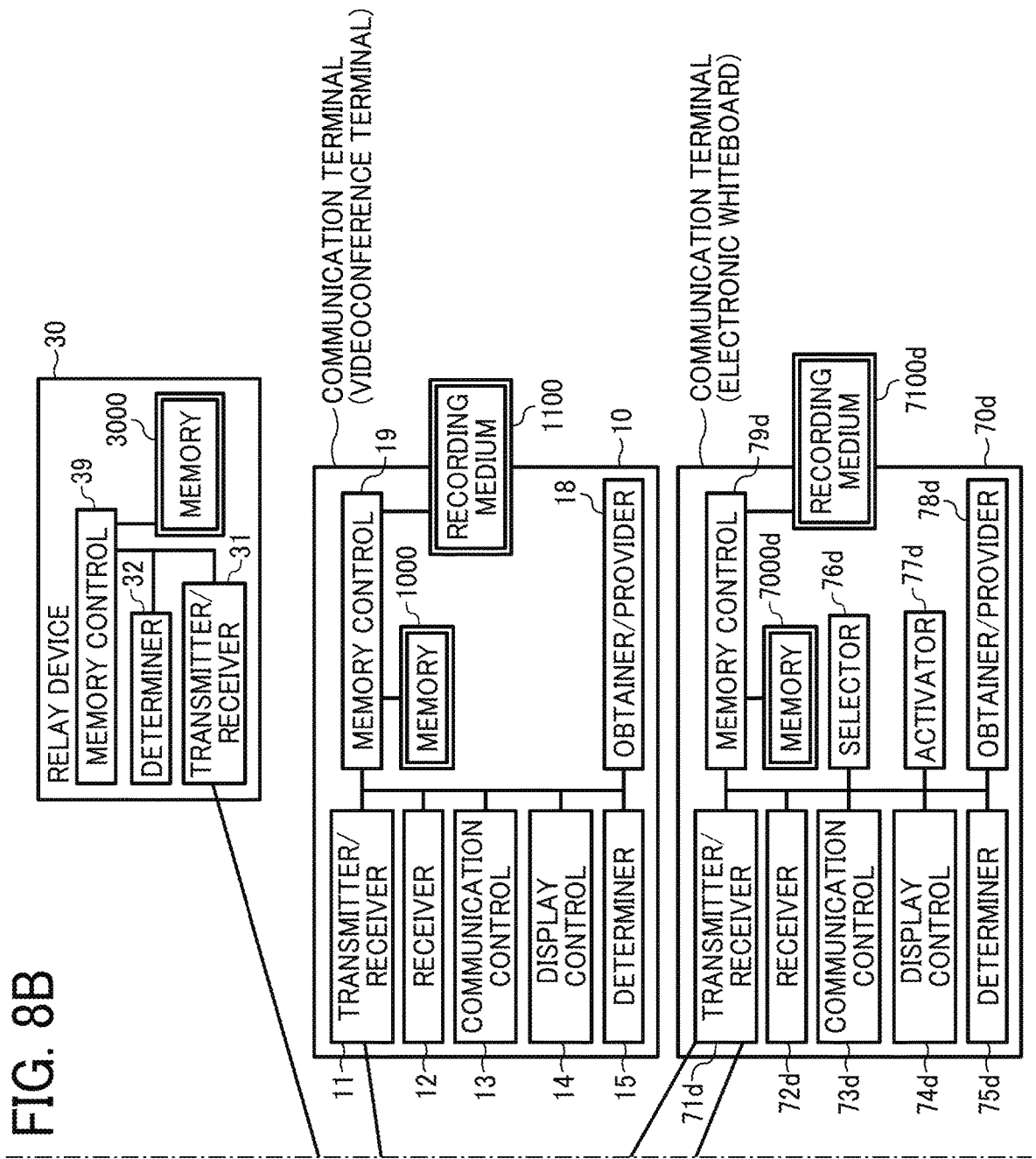

Referring to FIGS. 2 to 5 and 8, a functional configuration of the communication system is described according to the embodiment of the present invention. FIG. 8 is a schematic block diagram illustrating a functional configuration of the communication system 1 of FIG. 1 according to the embodiment of the present invention.

<Functional Configuration of Communication Terminal>

The communication terminal 10 includes a transmitter/receiver 11, an acceptor 12, a communication control 13, a display control 14, a determiner 15, an obtainer/provider 18, and a memory control 19. These units are functions that are implemented by or that are caused to function by operating any of the hardware components illustrated in FIG. 2 in cooperation with the instructions of the CPU 101 according to the communication control program expanded from the flash memory 104 to the RAM 103. The communication terminal 10 further includes a memory 1000 configured by the RAM 103 illustrated in FIG. 2, and the flash memory 104 illustrated in FIG. 2. The communication terminal 10 may be provided with a recording medium 1100 that is removable, which may be implemented by the medium 106 of FIG. 2.

The transmitter/receiver 11, which may be implemented by the instructions of the CPU 101, the network I/F 111, and the external device connection I/F 118, illustrated in FIG. 2, transmits or receives various data (or information) to or from the other terminal, apparatus, or system through the communication network 4. Before starting communication with a counterpart terminal, the transmitter/receiver 11 starts receiving terminal state information indicating an operating state of each communication terminal as a candidate counterpart terminal, from the communication management system 50. The state information not only indicates the operating state of each communication terminal (whether the communication terminal is online or offline), but also indicates a detailed state such as whether the communication terminal whose state is online is now capable of communicating or is currently communicating, or the user of the communication terminal is not at the communication terminal. Hereinafter, the case in which the state information indicates the operating state will be described by way of example.

The transmitter/receiver 11 further controls processing to start communication between the communication terminal 10 and a counterpart communication terminal such as the communication terminal 70.

The acceptor 12, which is implemented by the instructions of the CPU 101 illustrated in FIG. 2 and by the operation key 108 and the power switch 109 illustrated in FIG. 2, accepts various inputs from the user.

The communication control 13 is implemented by the instructions of the CPU 101, and any desired device relating to input or output of content data. In one example, the communication control 13 is implemented by the instructions of the CPU 101 illustrated in FIG. 2 and by the camera 112 and the imaging element I/F 113 illustrated in FIG. 2. The communication control 13 captures an image of a subject and outputs image data obtained by capturing the image. In one example, the communication control 13 is implemented by the instructions of the CPU 101 illustrated in FIG. 2 and by the audio input/output I/F 116 illustrated in FIG. 2. After the sound of the user is converted to an audio signal by the microphone 114, the communication control 13 receives audio data according to this audio signal. In another example, the communication control 13 is implemented by the instructions of the CPU 101 illustrated in FIG. 2 and by the audio input/output I/F 116 illustrated in FIG. 2, and outputs the audio signal according to the audio data to the speaker 115, and the speaker 115 outputs audio.

The display control 14 is implemented by the instructions of the CPU 101 illustrated in FIG. 2 and by the display I/F 117 illustrated in FIG. 2. The display control 14 combines images of different resolutions and transmits the combined image to the display 120. The display control 14 also transmits information on a contact list, received from the management system 50, to the display 120, and controls display of the contact list on the display 120.

The determiner 15, which may be implemented by the instructions of the CPU 101 illustrated in FIG. 2, determines whether any communication terminal, such as the mobile terminal, is located within a predetermined distance from the communication terminal 10.

The obtainer/provider 18, which may be implemented by the instructions of the CPU 101, and the near-distance communication circuit 119 with the antenna 119a, illustrated in FIG. 2, communicates with the counterpart communication terminal such as the mobile terminal 90 (90a, 90d) to transmit (provide) data or receive (obtain) data to or from the counterpart communication terminal.

The memory control 19, which is implemented by the instructions of the CPU 101 and the SSD 105 illustrated in FIG. 2, or by the instructions of the CPU 101, performs processing to store various types of data in the memory 1000 or the recording medium 1100 or to read various types of data stored in the memory 1000 or the recording medium 1100. Further, every time image data and audio data are received in performing communication with a counterpart terminal, the memory 1000 overwrites the image data and audio data. The display 120 displays an image based on image data before being overwritten, and the speaker 115 outputs audio based on audio data before being overwritten.

Note that a terminal ID in the embodiment is an example of identification information that is used to uniquely identify a specific communication terminal 10, such that a language, a character(s), a symbol(s), or various marks are not limited to the above-described embodiment. For example, a combination of at least two of the above-mentioned language, character(s), symbol(s), and various marks may be used as a terminal ID. Instead of a terminal ID, a user ID for identifying the user at the terminal 10 may be used. In such case, terminal identification information includes not only the terminal ID, but also the user ID. Further, the user ID may include a name of the user, the individual number that uniquely assigns each user such as a social security number, etc.

<Functional Configuration of Relay Device>

The relay device 30 includes a transmitter/receiver 31, a determiner 32, and a memory control 39. These units are functions that are implemented by or that are caused to function by operating any of the elements illustrated in FIG. 3 in cooperation with the instructions of the CPU 501 according to the relay device control program expanded from the HD 504 to the RAM 503. The relay device 30 also includes a memory 3000 implemented by the RAM 504 illustrated in FIG. 3 and/or the HD 504 illustrated in FIG. 3.

(Functional Configuration of Relay Device)

Next, a functional configuration of the relay device 30 is described in detail. In the following description of functional configuration of the relay device 30, relationships of the hardware elements in FIG. 3 with the functional configuration of the relay device 30 in FIG. 8 will also be described.

The transmitter/receiver 31 of the relay device 30 illustrated in FIG. 8, which is implemented by the instructions of the CPU 501 illustrated in FIG. 3 and by the network I/F 509 illustrated in FIG. 3, transmits or receives various types of data (or information) to or from another terminal, device, or system via the communication network 4. The transmitter/receiver 31 also serves as a transferer, which transfers content data transmitted from one communication terminal (such as the communication terminal 10) to another communication terminal (such as the communication terminal 70).

The determiner 32, which may be implemented by the instructions of the CPU 501 illustrated in FIG. 3, determines delay of data transmission.

The memory control 39, which may be implemented by the instructions of the CPU 501 illustrated in FIG. 3 and the HDD 505 illustrated in FIG. 3, performs processing to store various types of data in the memory 3000 or read various types of data stored in the memory 3000.

<Functional Configuration of Management System>

The communication management system 50 includes a transmitter/receiver 51, a determiner 52, and a memory control 59. These units are functions that are implemented by or that are caused to function by operating any of the elements illustrated in FIG. 8 in cooperation with the instructions of the CPU 501 according to the communication management program expanded from the HD 504 to the RAM 503. In addition, the communication management system 50 includes a memory 5000 implemented by the HD 504 illustrated in FIG. 3.

(Authentication Management Table)

FIG. 9 is an illustration of an example data structure of an authentication management table. The memory 5000 stores an authentication management DB 5001 such as the authentication management table illustrated in FIG. 9. The authentication management table stores, for each one of the terminals (10, 70) managed by the communication management system 50, the terminal ID and the password in association with each other. For example, the authentication management table illustrated in FIG. 9 indicates that the terminal ID of the terminal 10aa is "01aa", and the password of the terminal 10aa is "aaaa".

(Terminal Management Table)

FIG. 10 is an illustration of an example data structure of a terminal management table. The memory 5000 stores a terminal management DB 5002 such as the terminal management table illustrated in FIG. 10. The terminal management table stores, for each one of the terminals (such as the communication terminals 10 and 70) managed by the communication management system 50, the terminal ID of the terminal, a counterpart terminal name in the case where the terminal serves as a counterpart terminal, the operating state of the terminal, a date/time received at which login request information described later is received at the communication management system 50, and the IP address of the terminal, in association with one another. For example, the terminal management table illustrated in FIG. 10 indicates that the terminal 10aa with the terminal ID "01aa" has the counterpart terminal name "AA terminal, Tokyo office, Japan", the operating state "online (communication OK)", the date/time received at which login request information is received by the communication management system 50 "Apr. 10, 2015, 13:40", and the IP address "1.2.1.3". The terminal ID, the terminal (counterpart) name, and the terminal IP address in the terminal management table of FIG. 10 is registered by the communication management system 50, when the communication management system 50 accepts registration of each communication terminal (10, 70) that requests services from the communication management system 50.

(Contact List Management Table)

FIG. 11 is an illustration of an example data structure of a contact list management table. The memory 5000 further stores a contact list management DB 5003 implemented by the contact list management table illustrated in FIG. 11. The contact list management table stores, for each one of the terminals managed by the communication management system 50, the terminal ID of the terminal (starting terminal) that requests to start communication, in association with the terminal IDs of all counterpart terminals registered as candidate counterpart terminals for the starting terminal. For example, the contact list management table illustrated in FIG. 11 indicates that candidates for a counterpart terminal to which a starting terminal (terminal 10aa) whose terminal ID is "01aa" can send a request to start communication in a videoconference are the terminal 10ab whose terminal ID is "01ab", the terminal 10ba whose terminal ID is "01ba", the terminal 70bb whose terminal ID is "07bb", and so forth. Note that the terminal 70bb is one example of the communication terminal 70, as the electronic whiteboard 70 in FIG. 6. The candidate counterpart terminals are updated by addition or deletion in response to an addition or deletion request received from an arbitrary terminal (starting terminal) to the communication management system 50.

The contact list is just one example of contact information indicating a candidate of counterpart communication terminals, such that the contact information may be managed in various ways other than in the form of contact list, as long as the counterpart terminal information is associated with the starting terminal.

(Functional Configuration of Management System)

Next, referring back to FIG. 7, a functional configuration of the communication management system 50 will be described in detail. In the following description of the functional configuration of the communication management system 50, relationships of the hardware configuration of FIG. 3 with functional configuration of the management system 50 in FIG. 8 will also be described.

The transmitter/receiver 51, which is implemented by the instructions of the CPU 501 illustrated in FIG. 3 and by the network I/F 509 illustrated in FIG. 3, transmits or receives various types of data (or information) to or from another terminal, device, or system via the second communication network 4.

The determiner 15, which may be implemented by the instructions of the CPU 501 illustrated in FIG. 3, outputs a determination result.

The memory control 59, which may be implemented by the instructions of the CPU 501 illustrated in FIG. 3 and the HDD 505 illustrated in FIG. 3, performs processing to store various types of data in the memory 5000 or read various types of data stored in the memory 5000.

<Functional Configuration of Communication Terminal>

Since the communication terminal 70a and the communication terminal 70d are substantially similar in functional configuration, the functional configuration of the communication terminal 70a is described as an example while omitting explanation of the communication terminal 70d.

<Functional Configuration of Communication Terminal>

The communication terminal 70d includes a transmitter/receiver 71a, an acceptor 72a, a communication control 73a, a display control 74a, a determiner 75a, a selector 76a, an activator 77a, an obtainer/provider 78a, and a memory control 79a.

These units are functions that are implemented by or that are caused to function by operating any of the elements illustrated in FIG. 4 in cooperation with the instructions of the CPU 701 according to the communication control program expanded from the SSD 704 to the RAM 703. The communication terminal 70a further includes a memory 7000a configured by the RAM 703 illustrated in FIG. 4, and the SSD 704 illustrated in FIG. 4. The communication terminal 70a may be provided with a recording medium 7100a that is removable.

The transmitter/receiver 71a, which may be implemented by the instructions of the CPU 701, the network controller 705, and the external device connection I/F 706, illustrated in FIG. 4, transmits or receives various data (or information) to or from the other terminal, apparatus, or system through the communication network 2 or 4. Before starting communication with a counterpart terminal, the transmitter/receiver 71a starts receiving terminal state information indicating an operating state of each communication terminal (10, 70) as a candidate counterpart terminal, from the communication management system 50. The state information not only indicates the operating state of each communication terminal 10 or 70 (whether the communication terminal is online or offline), but also indicates a detailed state such as whether the communication terminal 10 or 70 whose state is online is now capable of communicating or is currently communicating, or the user of the communication terminal 10 or 70 is not at the communication terminal. In addition, the state information not only indicates the operating state of each terminal, but also indicates various states, such as the state that the cable 120c is disconnected from the terminal 10, the state that the terminal 10 or 70 can output sounds but not images, or the state that the terminal 10 or 70 is muted. Hereinafter, the case in which the state information indicates the operating state will be described by way of example.

The transmitter/receiver 71a further controls processing to start communication with the other communication terminal such as the counterpart communication terminal 10. The transmitter/receiver 71a also functions as a generator to generate authentication information such as a pass code.

The acceptor 72a, which is implemented by the instructions of the CPU 701, the contact sensor 715, and the electronic pen controller 716, illustrated in FIG. 4, accepts various inputs from the user.

The communication control 73a is implemented by the instructions of the CPU 701, in cooperation with any desired device relating to input or output of content data. In one example, the communication control 13 applies image processing to an image captured by the camera 762. In another example, the communication control 73a, after the audio of the user is converted to an audio signal by the microphone 764, the communication control 13 processes audio data based on this audio signal. In another example, the communication control 73a outputs the audio signal according to the audio data to the speaker 765, and the speaker 765 outputs audio.

In another example, the communication control 73a obtains drawing data, drawn by the user with the electronic pen 754 or the user's hand H onto the display 753, and converts the drawing data to coordinate data. Further, when the communication terminal 70a transmits the coordinate data to the other communication terminal 70d, for example, the other communication terminal 70d causes the display 753 to display drawing data based on the coordinate data received from the communication terminal 70a.

The display control 74a is implemented by the instructions of the CPU 701 illustrated in FIG. 4 and by the display controller 713 illustrated in FIG. 4. The display control 74 combines images of different resolutions and transmits the combined image to the display 753. The display control 74a also transmits information on a contact list, received from the communication management system 50, to the display 753, and controls display of the contact list on the display 753.

The determiner 75a, which may be implemented by the instructions of the CPU 701 illustrated in FIG. 4, determines whether any communication terminal, such as the mobile terminal 90, is within a predetermined distance from the communication terminal 70a. The determiner 75a further determines a type of terminal identification information as described below.

For example, if a description format of the terminal identification information indicates 32-bit numerals with four sets of 8-bit numerals (in case of IPv4), the determiner 75a determines that the terminal identification information is a terminal IP address.

In another example, the determiner 75a analyzes a description format of the terminal identification information to determine whether it is a sequence of characters and/or marks, and if so, determines that the terminal identification information is a terminal ID.

In case the terminal identification information has another type, such as an email address, the determiner 75a determines whether the terminal identification information is expressed as a string of characters as defined by RFC2822. That is, the determiner 75a determines whether a left of the mark "@" is a domain name, and a right of the mark "@" is an email server, and if so, determines that the terminal identification information is an email address.

In this embodiment, the terminal identification not only includes the case of a terminal ID, IP address, or email address, but also includes the case of a user ID identifying a user operating the communication terminal, or a user name of such user operating the communication terminal.

Further, in this embodiment, the communication application A1 is activated, for example, when the communication terminal 70a is turned on.

The selector 76a, may be implemented by the instructions of the CPU 701 according to the communication application A1 of FIG. 6B, selects communication application to be activated based on a type of the terminal identification information that has been determined by the determiner 75a. In case the terminal identification information is a terminal IP address, the selector 76a selects the communication application A1. In case the terminal identification information is a terminal ID, the selector 76a selects the communication application A2. Assuming that the communication application A3 is additionally installed, and in case the terminal identification information is an email address, the selector 76a selects the communication application A3.

The activator 77a, which may be implemented by the instructions of the CPU 701 according to the communication application A1 of FIG. 6B, activates the communication application selected by the selector 76a. When the selector 76a selects the communication application A1, since the communication application A1 has been activated, the activator 77a does not have to activate the communication application A1.

The obtainer/provider 78a, which may be implemented by the instructions of the CPU 701, the near-distance communication circuit 719 with the antenna 719a, illustrated in FIG. 4, communicates with the counterpart communication terminal to transmit (provide) data or receive (obtain) data to or from the counterpart communication terminal.

The obtainer/provider 78a, which may be implemented by the instructions of the CPU 701, the near-distance communication circuit 719 with the antenna 719a, illustrated in FIG. 4, communicates with the counterpart communication terminal to transmit (provide) data or receive (obtain) data to or from the counterpart communication terminal.

The memory control 79a, which is implemented by the instructions of the CPU 701 and the SSD 704 illustrated in FIG. 4, or by the instructions of the CPU 701, performs processing to store various types of data in the memory 7000 or the recording medium 7100 or to read various types of data stored in the memory 7000 or the recording medium 7100. Further, every time image data and audio data are received in performing communication with a counterpart terminal, the memory 7000a overwrites the image data and audio data. The display 753 displays an image based on image data before being overwritten, and the speaker 765 outputs audio based on audio data before being overwritten.

<Functional Configuration of Mobile Terminal>

Since the mobile terminal 90a and the mobile terminal 90d are substantially similar in functional configuration, the functional configuration of the mobile terminal 90a is described as an example while omitting explanation of the mobile terminal 90d.

The mobile terminal 90a includes a transmitter/receiver 91a, an acceptor 92a, a communication control 93a, a display control 94a, a determiner 95a, an obtainer/provider 98a, and a memory control 99a. These units are functions that are implemented by or that are caused to function by operating any of the hardware elements illustrated in FIG. 5 in cooperation with the instructions of the CPU 901 according to the communication control program expanded from the EEPROM 904 to the RAM 903. The communication terminal 90a further includes a memory 9000a configured by the RAM 903 illustrated in FIG. 5, and the EEPROM 704 illustrated in FIG. 5. The communication terminal 90a may be provided with a recording medium 9100a that is removable, which may be implemented by the medium 907 of FIG. 5.

(Functional Configuration of Mobile Terminal)

Next, a functional configuration of the mobile terminal 90a is described in detail. The transmitter/receiver 91a, which may be implemented by the instructions of the CPU 901, and the near-distance communication circuit 911 with the antenna 911a, illustrated in FIG. 5, transmits or receives various data (or information) to or from the other terminal, apparatus, or system through a mobile communication network.

The acceptor 92a, which is implemented by the instructions of the CPU 901 illustrated in FIG. 5 and by the touch panel 921 illustrated in FIG. 5, accepts various inputs from the user.

The communication control 93a is implemented by the instructions of the CPU 901 in cooperation with any desired device relating to input or output of content data. In one example, the communication control 93a, implemented by the instructions of the CPU 901 in cooperation with the imaging element I/F 913, applies image processing to an image captured by the camera 912. In another example, the communication control 93a is implemented by the instructions of the CPU 901 in cooperation with the audio input/output I/F 916. After the audio of the user is converted to an audio signal by the microphone 914, the communication control 93a processes audio data based on this audio signal. In another example, the communication control 93a, implemented by the instructions of the CPU 901 and the audio input/output I/F 916, outputs the audio signal according to the audio data to the speaker 915, and the speaker 915 outputs audio.

The display control 94a, which may be implemented by the instructions of the CPU 901, controls display of an image based on the image data through the display 917.

The determiner 95a, which may be implemented by the instructions of the CPU 901 illustrated in FIG. 5, outputs a determination result.

The obtainer/provider 98a, which may be implemented by the instructions of the CPU 901, and the near-distance communication circuit 919 with the antenna 919a, illustrated in FIG. 5, communicates with the counterpart communication terminal to transmit (provide) data or receive (obtain) data to or from the counterpart communication terminal.

The memory control 99a, which may be implemented by the instructions of the CPU 901 and the EEPROM 904, illustrated in FIG. 5, performs processing to store various types of data in the memory 9000a or read various types of data stored in the memory 9000a.

(Data Structure of Near-Distance Communication Circuit)

FIG. 12 illustrates a data structure of the near-distance communication circuit 919 of the mobile terminal 90. The near-distance communication circuit 919 has a data structure as illustrated in FIG. 12. With this data structure, the near-distance communication circuit 919 manages data by block number. For instance, a storage area with the block No. 1 stores an identifier of the near-distance communication circuit 919, and a storage area with the block No. 2 stores a user name of the mobile terminal 90.

The storage areas with the block Nos. 3 to 5 each store the terminal identification information of the communication terminal 10 or 70, which is obtained by the mobile terminal 90 by near-distance communication. The storage areas with the block Nos. 3, 4, and 5 respectively store the IP address, the terminal ID, and the email address. The storage areas with the block Nos. 6 to 8 each store the terminal identification information of the communication terminal 10 or 70, which receives the terminal identification information that is transmitted from the mobile terminal 90 via the mobile communication network. In FIG. 12, four digits indicate a simplified expression of IP address in Internet Protocol version 4 (IPv4). For simplicity, the IP address is expressed in IPv4, but the IP address may be expressed in IPv6 instead.

<Operation>

Referring now to FIGS. 7 and 13 to 21, operation of the communication system 1 is described according to an embodiment of the present invention.

Figure 13:
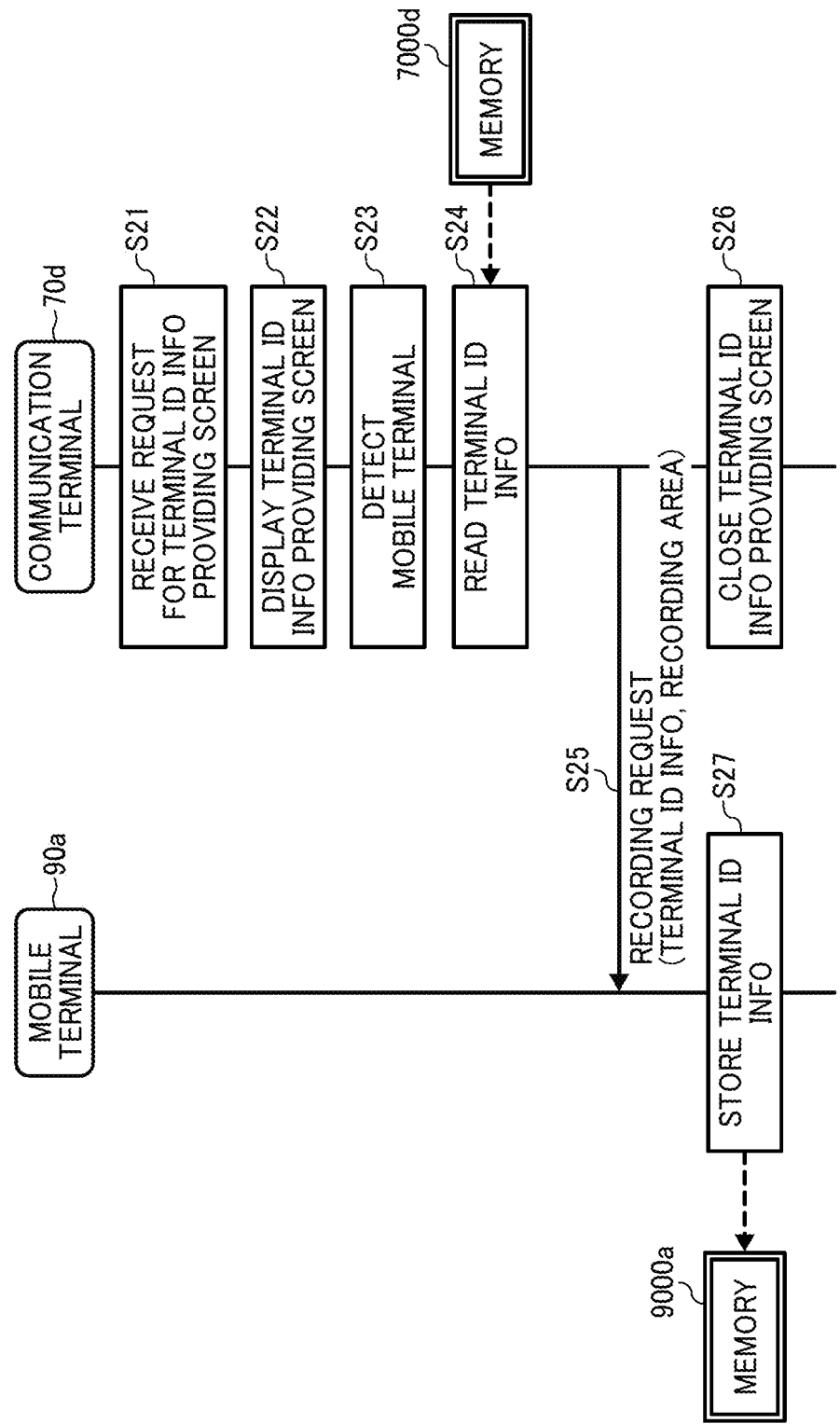
FIG. 13 is a data sequence diagram illustrating operation of providing terminal identification information, from the communication terminal of the communication system of FIG. 1 to the mobile terminal, according to an embodiment of the present invention.
Figure 14:
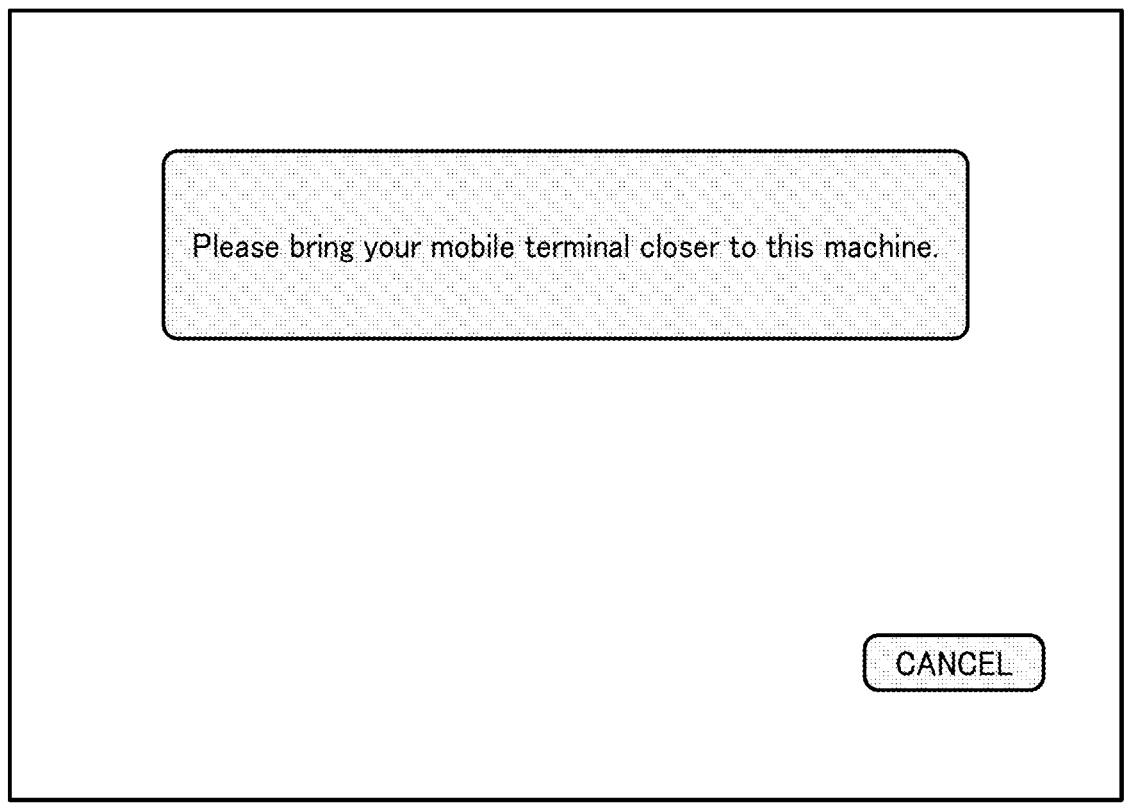
FIG. 14 is an illustration of an example screen for display in providing the terminal identification information.

FIG. 7 illustrates a case in which the user X (Kato), who travels from site D to site A, calls the user Y (James) at the site D to start videoconference. Before departing site D for site A, the user X moves the mobile terminal 90a of the user X close to either the communication terminal 10 or 70d, to cause the mobile terminal 90a to obtain the terminal identification information of the communication terminal 10 or 70d through near-distance wireless communication. At site A, the user X moves the mobile terminal 90a, which has the terminal identification information of the communication terminal 10 or 70d stored, close to the communication terminal 70a. Through near-distance wireless communication, the mobile terminal 90a transmits the terminal identification information of the communication terminal 10 or 70d to the communication terminal 70a. Depending on a type of terminal identification information that is obtained, the communication terminal 70a selects to communicate with the communication terminal 70d via the first communication network 2, or with the communication terminal 10 via the second communication network 4. Referring to FIGS. 13 and 14, operation of obtaining terminal identification information identifying the communication terminal 70d from the communication terminal 70d, performed by the mobile terminal 90a, is described according to an embodiment of the present invention.

FIG. 13 is a data sequence diagram illustrating operation of providing the terminal identification information. FIG. 14 is a screen for display in providing the terminal identification information. In this example, the IP address is used as the terminal identification information, by the communication terminal 70d according to the communication application A1.

As the user X at site D operates the communication terminal 70d with the electronic pen 754 or the user's hand H, the acceptor 72d of the communication terminal 70d accepts an instruction for displaying a terminal identification information providing screen (S21). The display control 74d causes the display 753 to display the providing screen as illustrated in FIG. 14 (S22).

The determiner 75d determines whether the mobile terminal 90a is brought closer to the communication terminal 70d (S23). The following assumes the case in which the user X brings the mobile terminal 90a close to the communication terminal 70d such that the mobile terminal 90a is detected.

The memory control 79d of the communication terminal 70d reads out the terminal identification information of the communication terminal 70d from the memory 7000d (S24).

The obtainer/provider 78d of the communication terminal 70d transmits a recording request for requesting to record the terminal identification information of the communication terminal 70d, to the mobile terminal 90a via near-distance wireless communication (S25). The recording request includes the terminal identification information of the communication terminal 70d, and recording area information indicating an area to store the terminal identification information at the mobile terminal 90a. The obtainer/provider 98a of the mobile terminal 90a receives the recording request. More specifically, the obtainer/provider 98a obtains the terminal identification information and the recorded area information. The memory control 99a stores the terminal identification information in the memory 9000a, as indicated by the recorded area information (S27). For example, as illustrated in FIG. 12, the IP address of the communication terminal 70d, which is an example of the terminal identification information, is stored in a storage area identified with the block No. 3.

As illustrated in FIG. 7, the user X at site D moves to site A. The user X prepares to start communication with the user Y at site D.

Figure 15:
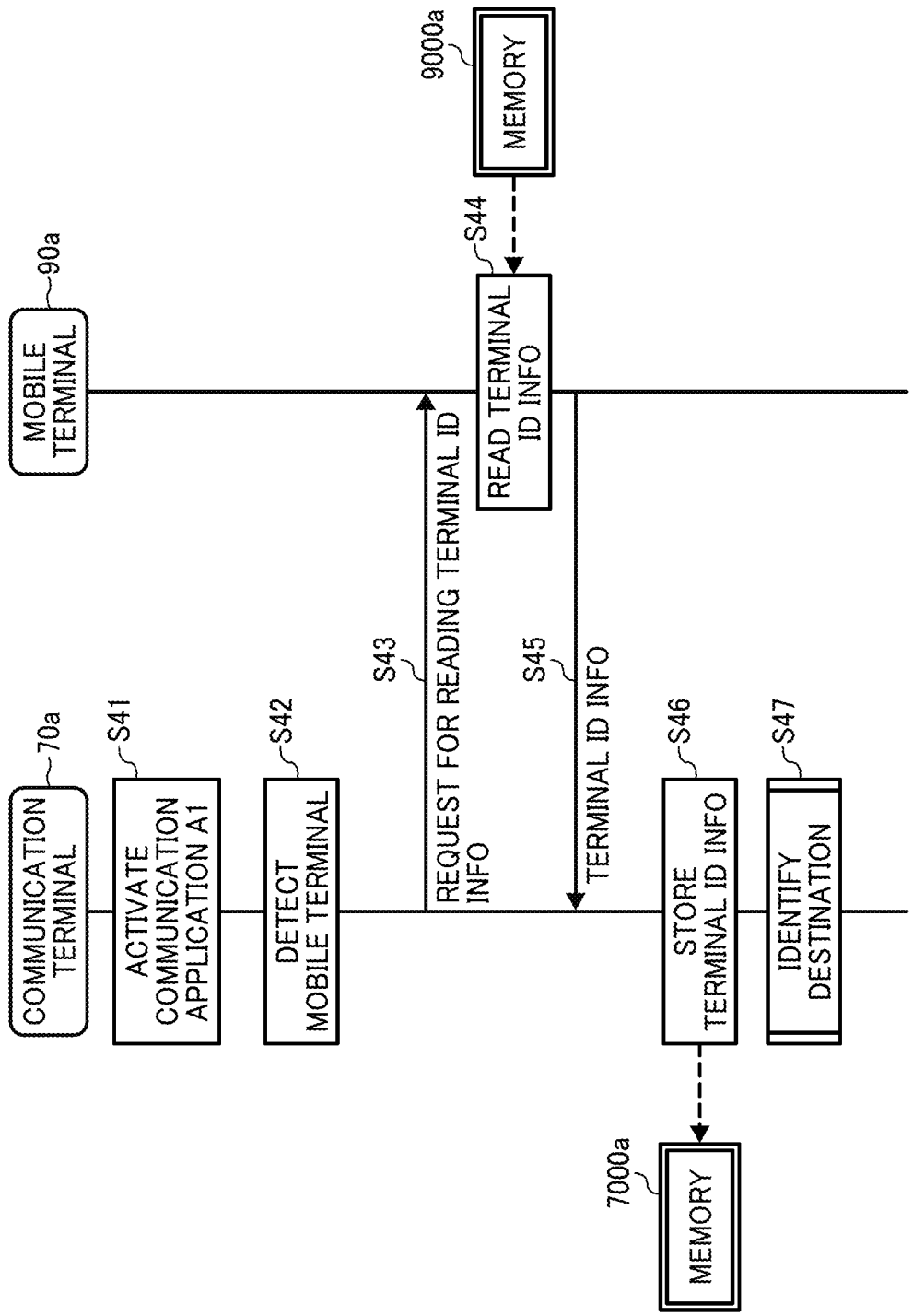
FIG. 15 is a data sequence diagram illustrating operation of providing terminal identification information, from the mobile terminal to the communication terminal of the communication system of FIG. 1, according to an embodiment of the present invention.
Figure 16:
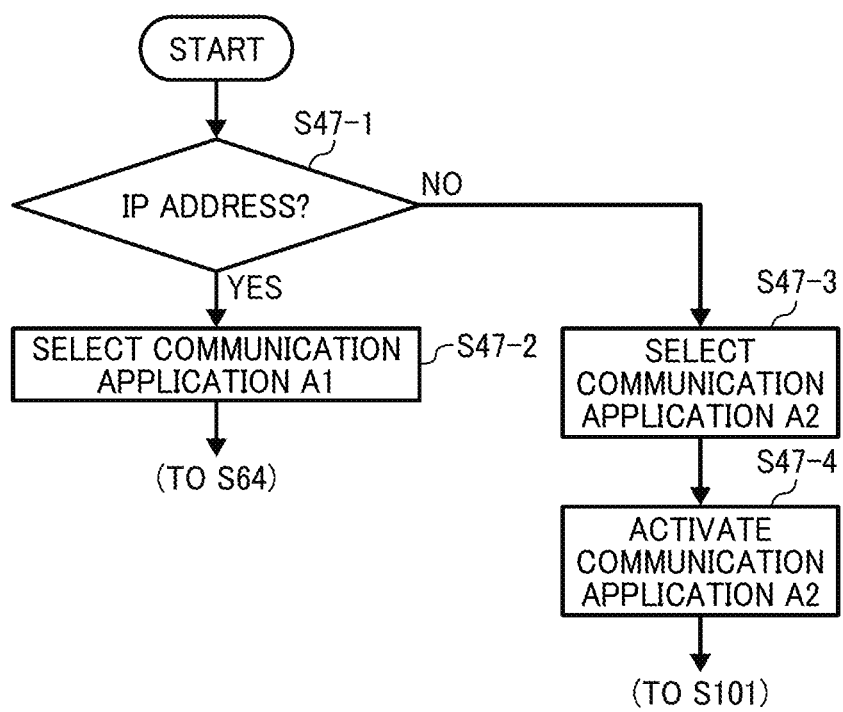
FIG. 16 is a flowchart illustrating operation of identifying a destination according to an embodiment of the present invention.

Referring to FIGS. 15 and 16, operation of obtaining terminal identification information for identifying the communication terminal 70d from the mobile terminal 90a, by the communication terminal 70a, is described according to an embodiment of the present invention. FIG. 15 is a data sequence diagram illustrating operation of obtaining the terminal identification information. FIG. 16 is a flowchart illustrating operation of identifying a destination.

In response to a request for activating the communication application A1, as instructed by the user X at site A, the acceptor 72a of the communication terminal 70a activates the communication application A1 (S41). The determiner 75a of the communication terminal 70a determines whether any device is detected near the communication terminal 70a (S42). The following assumes the case in which the user X brings the mobile terminal 90a close to the communication terminal 70a such that the mobile terminal 90a is detected.

The obtainer/provider 78a of the communication terminal 70a transmits a request for reading the terminal identification information to the mobile terminal 90a via near-distance wireless communication (S43). The memory control 99a of the mobile terminal 90a reads out the terminal identification information (in this example, the IP address) of the communication terminal 70d from the memory 9000a.

Next, the obtainer/provider 98a of the mobile terminal 90a transmits the terminal identification information of the communication terminal 70d, which is read, to the communication terminal 70a via near-distance wireless communication (S45). The obtainer/provider 78a of the communication terminal 70a receives the terminal identification information of the communication terminal 70d. The memory control 79a stores the terminal identification information in the memory 7000a (S46).

The communication terminal 70a identifies a destination using the terminal identification information (IP address) that is received at S45 (S47). Referring to FIG. 16, S47 of identifying the destination is described.

As illustrated in FIG. 16, the determiner 75a of the communication terminal 70a determines whether the received terminal identification information is an IP address (S47-1). In case the determination indicates that the terminal identification information is a terminal IP address ("YES" at S47-1), the selector 76a selects the communication application A1 for use (S47-2). The operation proceeds to S64 of FIG. 17.

In case the determination indicates that the terminal identification information is not a terminal IP address ("NO" at S47-1), the selector 76a selects the communication application A2 for use (S47-3). The activator 77a activates the communication application A2 for use (S47-4). The operation proceeds to S101 of FIG. 19A.

In this disclosure, the determiner 75a determines that the received terminal identification information is the IP address, such that the communication application A1 is selected to proceed to S64.

When there is an additional communication application that can be activated, and in case S47-1 is "NO", the determiner 75a further determines whether the received terminal identification information is a terminal ID. In case the determination indicates that the terminal identification information is a terminal ID, the selector 76a selects the communication application A2, and the activator 77a activates the communication application A2. In case the determination indicates that the terminal identification information is not a terminal ID, the selector 76 may select, for example, the communication application A3 that uses an email address as the terminal identification information. The activator 77a then activates the communication application A3. In case there are more than three applications available for use, the determiner 75a determines in a substantially similar manner as described above referring to S47-1, until it is capable of determining a specific type of terminal identification information corresponding to communication application to be used.

Figure 17:
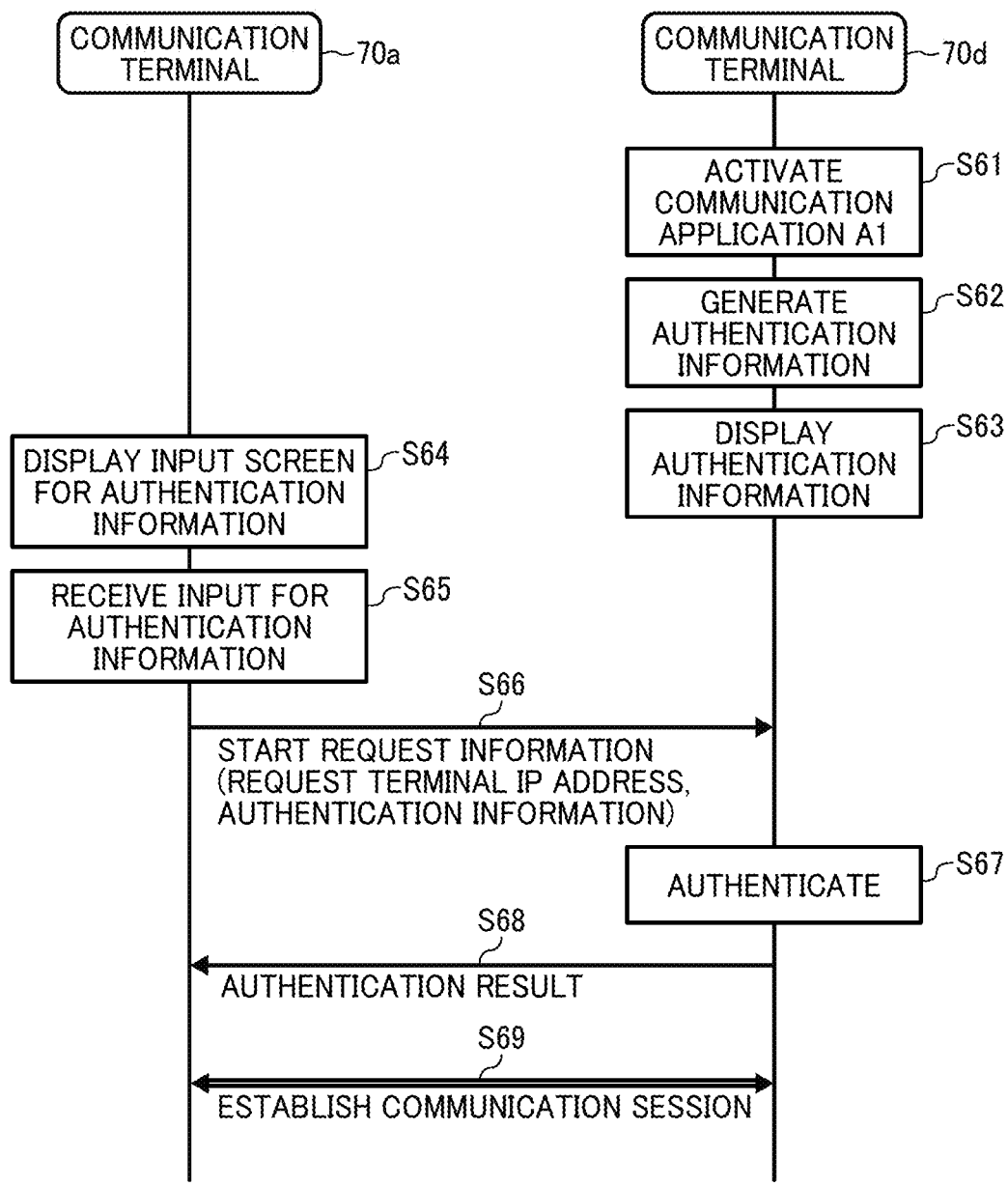
FIG. 17 is a data sequence diagram illustrating operation of establishing a communication session between the communication terminals as electronic whiteboards, according to an embodiment of the present invention.
Figure 18:
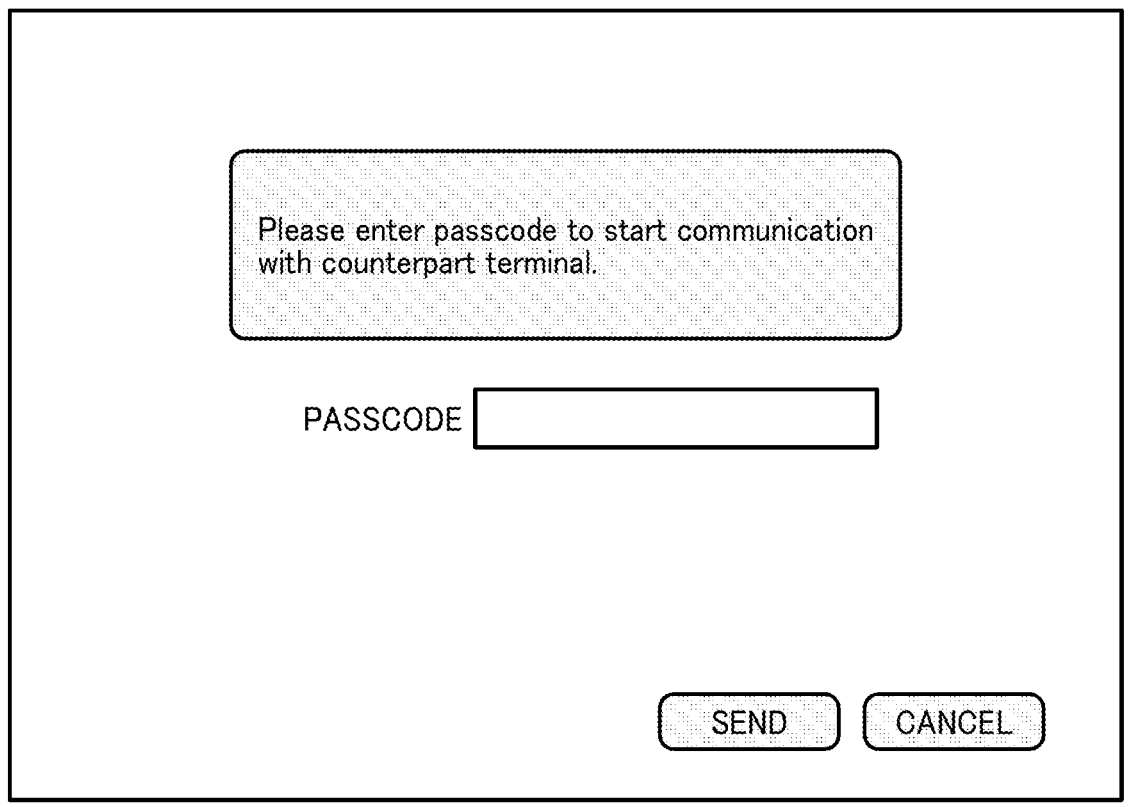
FIG. 18 is an illustration of an example input screen for authentication information.

Referring to FIGS. 17 and 18, the following describes the case where, at S47-2, the determiner 75a determines to start communication using the communication application A1. FIG. 17 is a data sequence diagram illustrating operation of establishing a communication session between the communication terminals 70a and 70d, each of which is the electronic whiteboard. FIG. 18 is an example screen for inputting authentication information.

The user X at site A calls the user Y at site D, and asks authentication information such as a pass code issued by the communication terminal 70d when the communication terminal 70d operates as a server for managing communication. In response to an instruction from the user Y at site D, the acceptor 72d of the communication terminal 70d activates the communication application A1, as communication application for the communication terminal 70d operating as the server (S61). As the communication terminal 70d operates as the server, the communication terminal 70a operates as a client. That is, the communication terminal 70 may operate as the server in some cases.

At the communication terminal 70d as the server, the transmitter/receiver 71a generates authentication information (S62). In this embodiment, the pass code such as a sequence of characters or numerals like "1234" is generated as the authentication information. The display control 74d causes the display 753 of the communication terminal 70d to display the generated authentication information (S63). The user Y at site D answers the user X at site A with the authentication information, which is displayed at the communication terminal 70d.

At site A, after S47-2 of FIG. 16, the display control 74a of the communication terminal 70a automatically displays an input screen for authentication information on the display 753, for example, as illustrated in FIG. 18 (S64). The user X, who now knows the authentication information, inputs the pass code with such as the electronic pen 754 on the input screen, and presses the "SEND" key. The acceptor 72a of the communication terminal 70a receives the input of the authentication information (S65). If pressing of the "CANCEL" key is detected, the operation ends in error without performing S66.

Next, the communication terminal 70a requests to start communication with the communication terminal 70d. Specifically, the transmitter/receiver 71a obtains the terminal identification information (IP address) that is stored in the memory at S46, and transmits a communication start request to the communication terminal 70d through the first communication network 2 (S66). The communication start request includes an IP address of the communication terminal 70a, and the authentication information that is input at S65. The transmitter/receiver 71d of the communication terminal 70d receives the communication start request.

The determiner 75*d* of the communication terminal 70*d* compares between the authentication information generated at S62 (first authentication information) and the authentication information received at S66 (second authentication information), to authenticate the communication terminal 70*a* (S67). The transmitter/receiver 71*d* of the communication terminal 70*d* transmits an authentication result to the communication terminal 70*a*. The communication terminal 70*a* receives the authentication result at the transmitter/receiver 71*a*.

In case the authentication result indicates that the communication terminal 70*a* requesting to start communication is a legitimate entity, a communication session (first communication session) is established between the transmitter/receiver 71*a* of the communication terminal 70*a* and the transmitter/receiver 71*d* of the communication terminal 70*d*. In case the authentication result indicates that the communication terminal 70*a* is not the legitimate entity, the communication session is not established.

As described above, through the communication session established between the communication terminal 70*a* and the communication terminal 70*d*, images can be shared between the sites A and D. More specifically, the image drawn on the display 753 by the user X with the pen 754 at the communication terminal 70*a*, is transmitted to the communication terminal 70*d* as coordinate data for display onto the display 753 of the communication terminal 70*d*. Similarly, the image drawn on the display 753 by the user Y with the pen 754 at the communication terminal 70*d*, is transmitted to the communication terminal 70*a* as coordinate data for display onto the display 753 of the communication terminal 70*a*. Further, since the communication terminals 70*a* and 70*d* each operate as a videoconference terminal, the user X and the user Y can freely communicate with each other, for example, by referring to the images that are drawn at both sides.

Now, as described above referring to FIG. 7, the case where the user X, who has obtained the terminal identification information of the communication terminal 10 as the videoconference terminal, travels to site A is described. In such case, referring to FIG. 12, the near-distance communication circuit 919 of the mobile terminal 90*a* stores the terminal ID of the communication terminal 10, in the storage area with the block No. 4. Referring back to FIG. 16, since the determination of S47-1 is "NO", the operation proceeds to S47-3 and S47-4, and further proceeds to S101 of FIG. 19A.

Figure 19B:
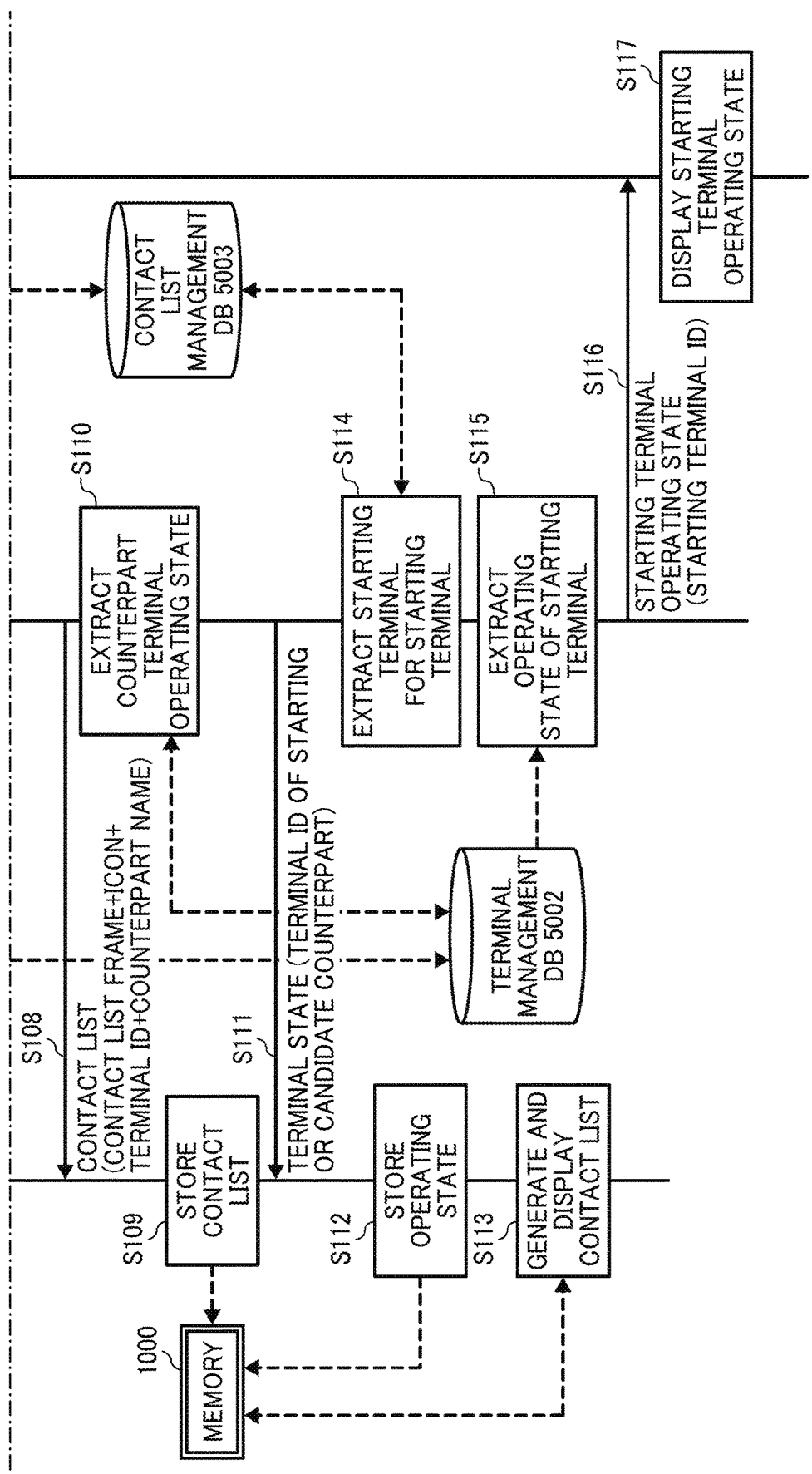
Figure 20:
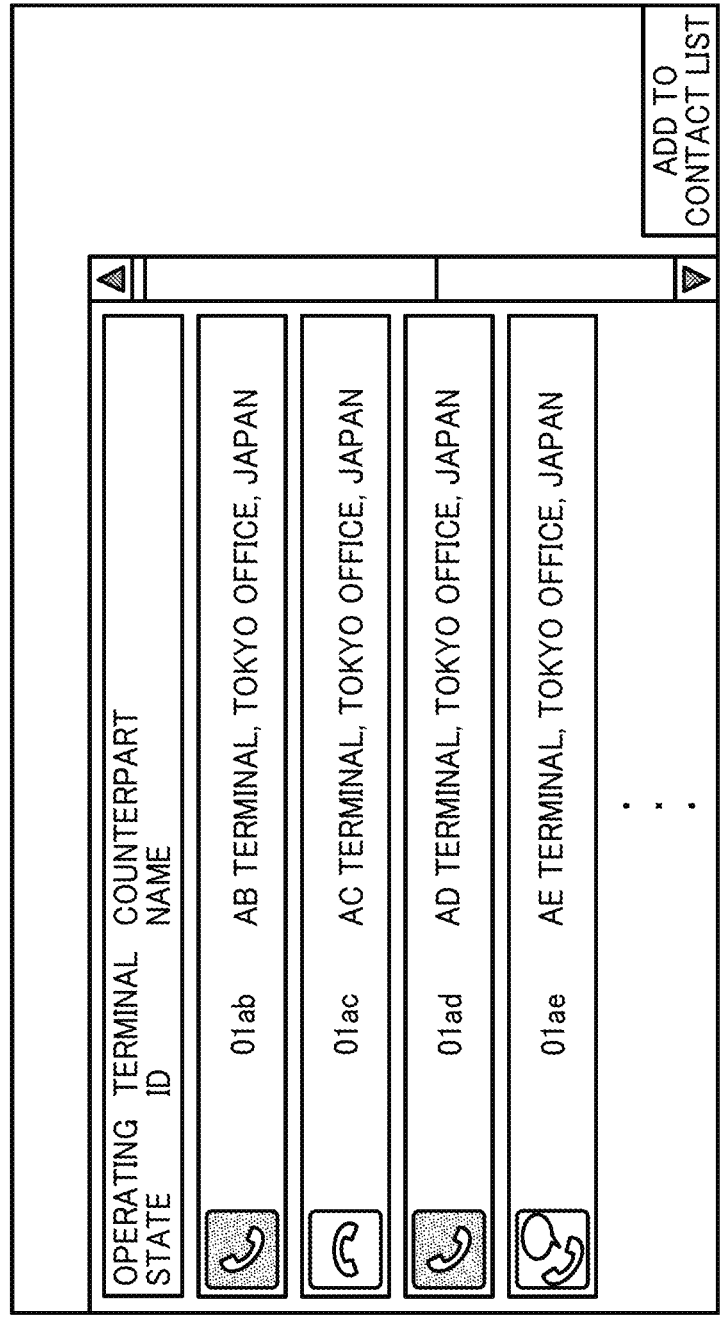
FIG. 20 is an illustration of an example contact list screen.
Figure 21:
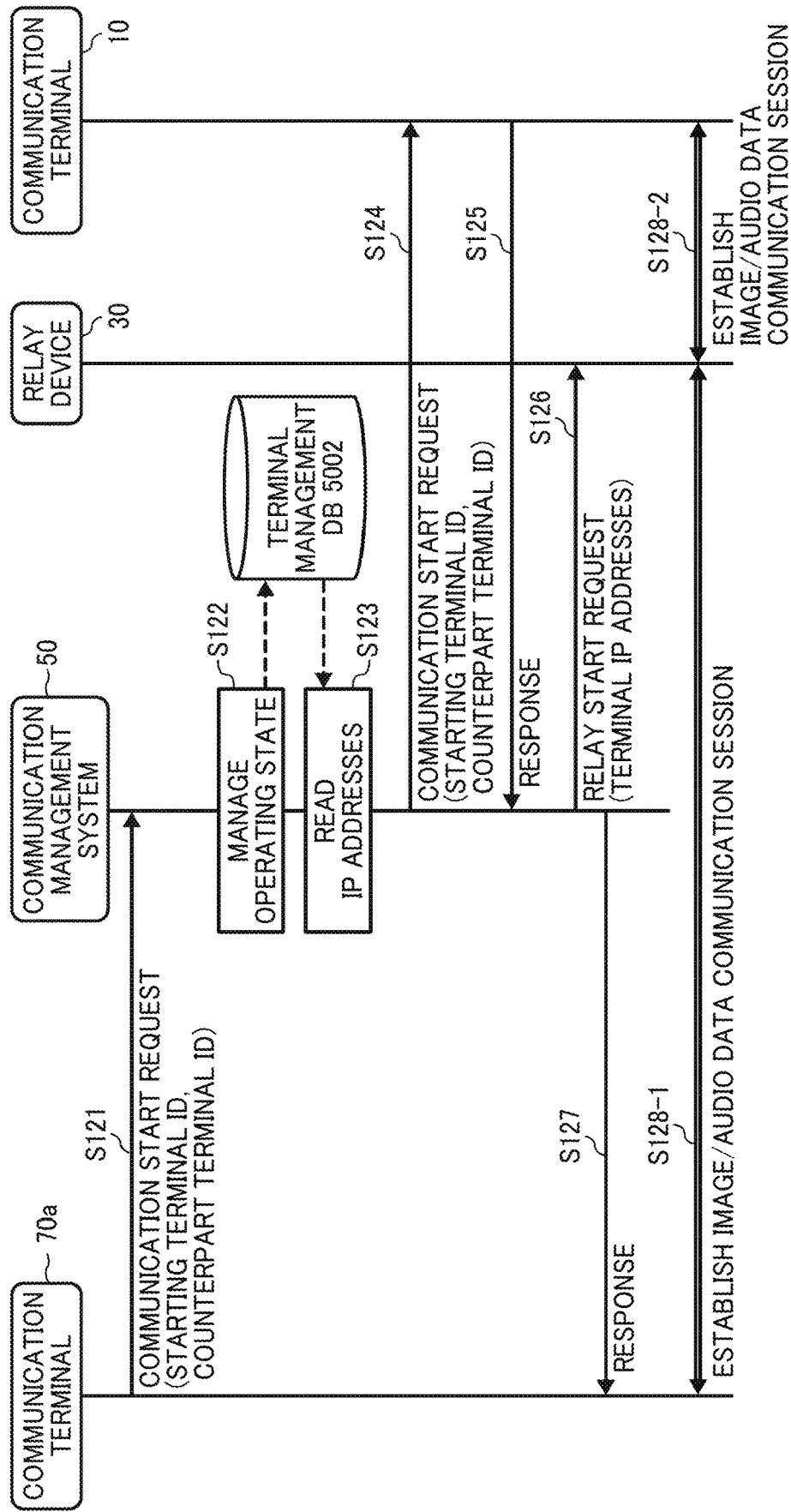
FIG. 21 is a data sequence diagram illustrating operation of establishing a communication session, according to an embodiment of the present invention.

Referring to FIGS. 19A and 19B (FIG. 19) to 21, operation of preparing for communication between the communication terminal 70*a* as the electronic whiteboard and the communication terminal 10 as the videoconference terminal is described according to an embodiment of the present invention. FIG. 19 is a data sequence diagram illustrating operation of preparing for communication between the communication terminal 70*a* and the communication terminal 10. FIG. 20 is an example screen of a contact list for display at the communication terminal 70*a*. FIG. 21 is a data sequence diagram illustrating operation of establishing a communication session between the communication terminal 70*a* as the electronic whiteboard and the communication terminal 10 as the videoconference terminal.

After S47-4 of FIG. 16, the transmitter/receiver 71*a* of the communication terminal 70*a* of the communication terminal 70*a* automatically transmits login request information indicating a login request to the communication management system 50 via the second communication network 4 (S101). The login request information includes a terminal ID for identifying the communication terminal 70*a*, which is a local terminal serving as a starting terminal, and a password. The terminal ID and the password are data that have been read via the memory control 79*a* from the memory 7000*a* and sent to the transmitter/receiver 71*a*.

Next, the memory control 59 of the management system 50 performs terminal authentication by searching the authentication management table of FIG. 9 using the terminal ID and the password included in the login request information received via the data transmitter/receiver 51 as search keys, and determining whether the same terminal ID and the same password are managed in the authentication management table of FIG. 9 (S102). In the case where the memory control 59 determines that the login request is a login request received from the authenticated terminal since the same terminal ID and the same password are managed, the memory control 59 stores, in a record for the terminal ID received at S101 in the terminal management table of FIG. 10, the operating state (Online (communication OK), and the date/time received at which the above-described login request information is received (S103). For example, if the communication terminal 70*a* has the terminal ID "01aa", the memory control 59 stores the operating state "Online (Communication OK)" and the date/time received "4.10.2015.13:40" in association with the terminal ID "01aa" in the terminal management table illustrated in FIG. 10. Further, in this example, the communication terminal 70*a* may transmit the IP address of the communication terminal 70*a* to the management system 50 at S101. Alternatively, the terminal IP address may be previously registered in the terminal management table in association with the terminal ID.

The transmitter/receiver 51 of the management system 50 transmits authentication result information indicating an authentication result obtained by the memory control 59 to the starting terminal (terminal 70*a*) which has sent the above-mentioned login request, via the second communication network 4 (S104). In the following, the case in which it has been determined by the memory control 59 that the communication terminal 70*a* is a terminal that has a legitimate use authority will be described as follows.

As the communication terminal 70*a*, which is the starting terminal, receives the authentication result information indicating that the communication terminal 70*a* is an authenticated terminal at the transmitter/receiver 71, the transmitter/receiver 71 of the communication terminal 70*a* transmits contact list request information that requests for contact list to the management system 50 through the communication network 2 (S105). The transmitter/receiver 51 of the management system 50 receives the contact list request information.

The memory control 59 of the management system 50 searches the contact list management table (FIG. 11) using the terminal ID "01aa" of the starting terminal 70*a* which has sent the login request as a search key, to extract the terminal ID of a candidate counterpart terminal that can communicate with the starting terminal 70*a*. The memory control 59 of the management system 50 further reads out the terminal name associated with each one of the extracted terminal IDs from the terminal management table (FIG. 10) (S106). In this example, at least the terminal ID and the terminal name of the terminal, for each one of one or more candidate counterpart terminals for the starting terminal 70*a* with the terminal ID "01aa", are extracted.

The memory control 59 of the communication management system 50 reads contact list frame data, and icon data reflecting the operating state of each candidate counterpart terminal that is read, from the memory 5000 (S107). The transmitter/receiver 51 further transmits the contact list information to the starting terminal 70a (S108 in FIG. 19B). The contact list information includes the contact list frame data, and the icon data, the terminal ID, and the terminal name of each candidate counterpart terminal (10 or 70). The starting terminal 79a, which receives the contact list information at the transmitter/receiver 71a, stores the received contact list information in the memory 7000a via the memory control 79a (S109).

As described above, in this embodiment, instead of managing contact list information at each communication terminal, the management system 50 centrally manages contact list information for all of the terminals 10 and 70. In this way, even when a communication terminal is newly added or the existing communication terminal is replaced with a different type of communication terminal, or even when contact list frame is changed, the communication management system 50 can centrally reflect such change without requiring each communication terminal to reflect such change.

The memory control 59 of the management system 50 searches the terminal management table (FIG. 10) using the extracted terminal IDs of the candidate counterpart terminals, as search keys, to obtain the operating states of the terminals (S110).

Next, the transmitter/receiver 51 of the management system 50 transmits counterpart terminal state information including the terminal IDs serving as the search keys used at S106 and the operating states of the counterpart terminals corresponding to these terminal IDs to the starting terminal 70a via the second communication network 4 (S111).

The memory control 79a of the starting terminal 70a stores the terminal state information, which may be received from the management system 50 sequentially or at once, in the memory 7000a (S112). Based on the terminal state information received for each candidate counterpart terminal, the starting terminal 70a is able to know the current operating state of each candidate counterpart terminal such as the operating state of the communication terminal 10.

Based on the contact list information and the terminal state information stored in the memory 7000a, the display control 74a of the starting terminal 70a generates a contact list that reflects the current operating state of each candidate counterpart terminal. The display control 74a further displays the contact list on the display 753 of FIG. 4, as illustrated in FIG. 20 (S113). In FIG. 20, the icons each reflecting the operating state of the corresponding terminal are displayed at left. More specifically, the icons in FIG. 20 indicate the operating states of "online (communication OK)", "offline", "online (communication OK)", and "online (communicating), from the top to the bottom.

The memory control 59 of the management system 50 further searches the contact list management table of FIG. 11 using the terminal ID "01aa" of the starting terminal 70a which has sent the login request as a search key, to extract the terminal ID of another starting terminal that registers the terminal ID "01aa" of the starting terminal 70a as a candidate counterpart terminal (S114). In the contact list management table illustrated in FIG. 11, the terminal IDs of other starting terminals that are extracted are "01ab", "01ac", and "01da", for example.

Next, the memory control 59 of the management system 50 searches the contact list management table (FIG. 10) using the terminal ID of the starting terminal 70a which has sent the login request as a search key, and obtains the operating state of the starting terminal 70a (S115).

The transmitter/receiver 51 transmits counterpart terminal state information including the terminal ID "01aa" and the operating state "Online (Communication OK)" of the starting terminal 70a, obtained at S115, to terminals (such as the terminal 10) whose operating states are "Online (Communication OK)" in the terminal management table (FIG. 10), among the terminals having the terminal IDs extracted at S115 (S116). When transmitting the counterpart terminal state information to the terminals such as the terminal 10, the transmitter/receiver 51 refers to the IP addresses of the terminals, which are managed in the terminal management table illustrated in FIG. 10, using the terminal IDs. Accordingly, the terminal ID "01aa" and the operating state "online" of the starting terminal (terminal 70a) which has sent the login request can be transmitted to other counterpart terminals that can communicate with the starting terminal (terminal 70a). The candidate counterpart terminal (such as the terminal 10) displays the operating state of each one of the candidate counterpart terminals, as illustrated in FIG. 19 (S117).

Next, as illustrated in FIG. 21, in this embodiment, the management system 50 transmits a communication start request to the communication management system 50. Specifically, the transmitter/receiver 71a transmits a communication start request to the communication management system 50 through the second communication network 4 (S121). The communication start request includes the terminal ID "01aa" of the starting terminal 70a, and the terminal ID "01da" of the counterpart terminal 10. The transmitter/receiver 51 of the management system 50 receives the communication start request.

On the basis of the terminal ID "01aa" of the starting terminal 70a and the terminal ID ("01 da") of the counterpart terminal 10, which are included in the communication start request, the memory control 59 of the communication management system 50 changes the operating state field of each of records including the above-mentioned terminal IDs "01aa" and "01da" to "communicating" in the terminal management table (FIG. 10) (S122). In this state, although the starting terminal 70a and the counterpart terminal 10 have not started communicating, these terminals enter a communicating state, and, if another terminal 10 or 70 tries to communicate with the starting terminal 70a or the counterpart terminal 10, a notification sound or display that indicates that the terminal is communicating is output.

Next, the memory control 59 of the communication management system 50 searches the terminal management table (FIG. 10) using the terminal ID "01aa" of the starting terminal 70a and the terminal ID "01da" of the counterpart terminal 10, received at S121, as search keys, to read corresponding IP addresses (S123).

The transmitter/receiver 51 of the management system 50 transmits the communication start request to the IP address of the counterpart terminal 10, which is read at S123 (S124). The communication start request includes the terminal IDs "01aa" and "01da", as received at S121. The transmitter/receiver 11 of the counterpart terminal 10 receives the communication start request.

The transmitter/receiver 11 of the counterpart terminal 10 transmits a response to the communication start request, to the communication management system 50 (S125). The transmitter/receiver 51 of the management system 50 receives the response to the communication start request. The communication start request indicates whether to accept or reject communication. The example case of accepting the communication start request is described.

The transmitter/receiver 51 of the management system 50 transmits a relay start request indicating a request for starting relaying to the relay device 30 (S126). The relay start request includes the IP addresses of the starting terminal 70a and the counterpart terminal read at S123. The transmitter/receiver 31 of the relay device 30 receives the relay start request.

The transmitter/receiver 51 of the management system 50 transmits the response to the communication start request, which is received at S125, to the starting terminal 70a (S127). As described above, in this example, the transmitter/receiver 71a of the starting terminal 70a receives the response accepting the communication start request.

As described above, the starting terminal 70a and the counterpart terminal 10 establish an image data/audio data communication session via the relay device 30 (S128-1, 2) to start videoconference.

According to at least one embodiment described above, the user X, who obtains the terminal identification information of the communication terminal at site D using the mobile terminal 90a, provides such terminal identification information to the communication terminal 70a at site A. Based on a type of the provided terminal identification information, the communication terminal 70a determines whether to use communication application A1 or A2 for communication with the communication terminal at site D. In case the communication application A2 is selected, the communication terminal 70a starts communication with the communication terminal 70d at site D through the first communication network 2 such as the Intranet. In case the communication application A1 is selected, the communication terminal 70a starts communication with the communication terminal 10 at site D through the second communication network 4 such as the Internet.

This greatly reduces time required for preparing to start communication among two or more communication terminals (such as between the communication terminals 70a and 70d, or the communication terminals 70a and 10). For instance, when starting communication with a counterpart communication terminal, using a communication terminal, a user at the communication terminal may need to select a communication application being used by the counterpart communication terminal for activation, as well as, inputting destination information such as an IP address or a terminal ID of the counterpart communication terminal. As described above, in one or more embodiments, the user only needs to bring a mobile terminal closer to the communication terminal to be operated by the user in communication. The communication terminal, which obtains counterpart terminal identification information, automatically selects a communication application to be used by the counterpart communication terminal, activates if not such communication application has not been activated, identifies the counterpart communication terminal using the selected communication application using the obtained counterpart terminal identification information, and transmits a communication start request to the counterpart communication terminal. Accordingly, the user does not have to make any selection of communication application, or input destination information, before starting communication, thus improving operability for the user.

The communication terminal (electronic whiteboard) 70a and the communication terminal (electronic whiteboard) 70d are communicable through a closed communication network 2 such as the Intranet, configuring the on-premises system. This improves security, such that an exchange of IP address can be safely achieved. The communication terminal (electronic whiteboard) 70a and the communication terminal (videoconference terminal) 10 are communicable through an open communication network 4 such as the Internet. Although this network is less secure at least compared to the communication network 2, the terminal identification information is exchanged in the form of a terminal ID, while managing the IP address at the communication management system 50. This system configuration can thus improve security.

In the above-described embodiment, the communication terminal (10, 70) provides the terminal identification information to the mobile terminal 90 by near-distance wireless communication, however, the communication terminal may provide using any other communication network such as by a USB cable.

In addition, although the case of a videoconference terminal or an electronic whiteboard has been described as an example of a communication terminal in the above-described embodiment, the embodiment is not limited to this case, and the communication system 1 may be a phone system such as an IP phone system or an Internet phone system, a car navigation terminal, or a monitoring camera. In alternative to the videoconference terminal and the electronic whiteboard, any other type of office equipment may be used such as a printer, facsimile, multifunctional peripheral (MFP), and projector. The communication terminal may be implemented as medical equipment, such as an endoscope, a Computed Tomography (CT) scan, and radiotherapy equipment, or agricultural equipment such as a cultivator.

Further, in alternative to the smart phone, any other mobile terminal may be used, such as a portable phone, digital camera, portable game machine, IC card, or wearable computer. A wearable computer includes a watch and a head-mounted display.

In addition, although image data and audio data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. Based on the received data of smell, a smell generator, which may be incorporated in or connected to the other terminal, may generate a smell based on such received data. The content data may be at least one of image data, audio data, touch data, and smell data.

Although the case in which a videoconference is held by the communication system 1 has been described in the above-described embodiment, the embodiment is not limited to this case. The communication system 1 may be used in meetings, general conversation between family members or friends, or one-way presentation of information.

In the above-described embodiment, the recording request or the reading request is transmitted or received by near-distance wireless communication. Alternatively, such request may be transmitted or received by ultrasonic communication. In alternative to transmitting the recording request, the communication terminal 10 or 70 may display an image encoded with the terminal ID (for example, in the form of a bi-dimensional bar code or a QR code). The mobile terminal 90a or 90d may capture the image with the camera to obtain the terminal ID of the communication terminal 10 or 70, and store the obtained the terminal ID in its memory. In alternative to transmitting the reading request, the communication terminal 10 or 70 may display an image encoded with the terminal ID (for example, in the form of a bi-dimensional bar code or a QR code). The mobile terminal 90a or 90d may capture the image with the camera to obtain the terminal ID of the communication terminal 10 or 70.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In one example embodiment, the present invention may reside in a non-transitory recording medium which, when executed by one or more processors, configured to perform a method including: receiving, from a mobile terminal, counterpart terminal identification information for identifying a counterpart communication terminal that the communication terminal is to start communication, the mobile terminal being a mobile terminal that has obtained the counterpart terminal identification information from the counterpart communication terminal; determining a communication application to be used by the counterpart communication terminal in communication with the communication terminal, based on the received counterpart terminal identification information; identifying, as the counterpart communication terminal, 1) a first counterpart communication terminal that uses a first communication application when the determined communication application is the first communication application, and 2) a second counterpart communication terminal that uses a second communication application when the determined communication application is the second communication application; and transmitting a communication start request to the identified counterpart communication terminal that uses the determined communication application, to start communication with the identified counterpart communication terminal through the determined communication application.

The invention claimed is:

1. A communication terminal configured to communicate with a counterpart communication terminal, the communication terminal comprising:
   circuitry configured to
      obtain identification information corresponding to the counterpart communication terminal by near-distance communication from a mobile terminal that is separate from the counterpart communication terminal; and
      communicate with the counterpart communication terminal using a communication application, wherein a type of communication application to be used differs according to the identification information that is obtained,
   wherein the type of communication application to be used is from of a group of different types of communication applications, each representing a different form of communicating within a conference among a plurality of communication terminals, and
   the circuitry selects one of the different types of communication applications, which is separately installed on the communication terminal from any other of the different types of communication applications, based on which of the plurality of different types of identification information corresponds to the obtained identification information.

2. The communication terminal of claim 1, wherein the identification information includes any one of an Internet Protocol (IP) address, an identification (ID) of the counterpart communication terminal, an email address, a user ID of a user of the counterpart communication terminal, and a name of the user of the counterpart communication terminal.

3. The communication terminal of claim 2, wherein the circuitry communicates with the counterpart communication terminal using the communication application via an intranet or the Internet.

4. The communication terminal of claim 1, wherein the near-distance communication is based on near-field communication (NFC) or Bluetooth.

5. The communication terminal of claim 1, wherein the group of different types of communication applications includes at least a video communication application and an electronic whiteboard application.

6. The communication terminal of claim 1, wherein the mobile terminal previously obtained the identification information from the communication counterpart terminal by near-distance communication.

7. The communication terminal of claim 1, wherein the identification information is one of a plurality of different types of identification information that includes an Internet Protocol (IP) address and at least one of an identification (ID) of the counterpart communication terminal, an email address, a user ID of a user of the counterpart communication terminal, and a name of the user of the counterpart communication terminal.

8. The communication terminal of claim 7, wherein when the obtained identification information is an IP address, the communication application that is selected is an electronic whiteboard application and the circuitry communicates with the counterpart communication terminal via the Internet, and
   when the obtained identification information is not an IP address, the communication application that is selected is a video communication application and the and the circuitry communicates with the counterpart communication terminal via an intranet.

9. A communication method, implemented by a communication terminal configured to communicate with a counterpart communication terminal, the communication method comprising:
   obtaining, by circuitry of the communication terminal, identification information corresponding to the counterpart communication terminal by near-distance communication from a mobile terminal that is separate from the counterpart communication terminal; and
   communicating, by the circuitry, with the counterpart communication terminal using a communication application, wherein a type of communication application to be used differs according to the identification information that is obtained,
   wherein the type of communication application to be used is from of a group of different types of communication applications, each representing a different form of communicating within a conference among a plurality of communication terminals, and the circuitry selects one of the different types of communication applications, which is separately installed on the communication terminal from any other of the different types of communication applications, based on which of the plurality of different types of identification information corresponds to the obtained identification information.

10. The communication method of claim 9, wherein the identification information includes any one of an Internet Protocol (IP) address, an identification (ID) of the counterpart communication terminal, an email address, a user ID of a user of the counterpart communication terminal, and a name of the user of the counterpart communication terminal.

11. The communication method of claim 10, wherein the method includes communicating with the counterpart communication terminal using the communication application via an intranet or the Internet.

12. The communication method of claim 9, wherein the near-distance communication is based on near-field communication (NFC) or Bluetooth.

13. A non-transitory computer-readable recording medium for storing therein a computer program that includes instructions which when executed on a communication terminal configured to communicate with a counterpart communication terminal, causes the communication terminal to execute a communication method comprising:

obtaining, by circuitry of the communication terminal, identification information corresponding to the counterpart communication terminal by near-distance communication from a mobile terminal that is separate from the counterpart communication terminal; and communicating, by the circuitry, with the counterpart communication terminal using a communication application, wherein a type of communication application to be used differs according to the identification information that is obtained, wherein the type of communication application to be used is from of a group of different types of communication applications, each representing a different form of communicating within a conference among a plurality of communication terminals, and the circuitry selects one of the different types of communication applications, which is separately installed on the communication terminal from any other of the different types of communication applications, based on which of the plurality of different types of identification information corresponds to the obtained identification information.

14. The non-transitory computer-readable recording medium of claim 13, wherein the identification information includes any one of an Internet Protocol (IP) address, an identification (ID) of the counterpart communication terminal, an email address, a user ID of a user of the counterpart communication terminal, and a name of the user of the counterpart communication terminal.

15. The non-transitory computer-readable recording medium of claim 14, wherein the method includes communicating with the counterpart communication terminal using the communication application via an intranet or the Internet.

16. The non-transitory computer-readable recording medium of claim 13, wherein the near-distance communication is based on near-field communication (NFC) or Bluetooth.

* * * * *